(12) United States Patent
Wang et al.

(10) Patent No.: US 11,995,251 B2
(45) Date of Patent: May 28, 2024

(54) WIRELESS CHARGING SYSTEM, CHIP, AND WIRELESS CHARGING CIRCUIT

(71) Applicant: Honor Device Co., Ltd., Shenzhen (CN)

(72) Inventors: Feng Wang, Shenzhen (CN); Yuan Wu, Shenzhen (CN); Wei Zhang, Shenzhen (CN); Chao Wang, Shenzhen (CN); Lilie Zhao, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 17/998,417

(22) PCT Filed: Jan. 27, 2022

(86) PCT No.: PCT/CN2022/074400
§ 371 (c)(1),
(2) Date: Nov. 10, 2022

(87) PCT Pub. No.: WO2022/193852
PCT Pub. Date: Sep. 22, 2022

(65) Prior Publication Data
US 2024/0028141 A1    Jan. 25, 2024

(30) Foreign Application Priority Data

Mar. 15, 2021   (CN) .......................... 202110293428.X
Mar. 31, 2021   (CN) .......................... 202110348557.4

(51) Int. Cl.
*G06F 3/038*      (2013.01)
*G06F 1/16*       (2006.01)
(Continued)

(52) U.S. Cl.
CPC ........ *G06F 3/03545* (2013.01); *G06F 1/1607* (2013.01); *G06F 3/021* (2013.01);
(Continued)

(58) Field of Classification Search
CPC ............. G06F 3/0383; G06F 3/041662; G06F 1/1643; G06F 3/03545; G06F 3/04164;
(Continued)

(56) References Cited

U.S. PATENT DOCUMENTS 10,809,826 B2    10/2020    Kwon et al.
2015/0205382 A1   7/2015    Hsiu et al.
(Continued)

FOREIGN PATENT DOCUMENTS

CN    104049778 A    9/2014
CN    104793761 A    7/2015
(Continued)

*Primary Examiner* — Deeprose Subedi
(74) *Attorney, Agent, or Firm* — Slater Matsil, LLP

(57) ABSTRACT

Embodiments of this application provide a wireless charging system, a chip, and a wireless charging circuit. The wireless charging system includes an electronic device and a stylus, where the electronic device is configured to wirelessly charge the stylus; and the stylus includes a wireless charging circuit. The wireless charging circuit includes a first coil, a chip, and a first battery, the chip includes a rectifier, a charger unit, a micro-control unit, and a protocol encoding/decoding unit. The charger unit includes a voltage-stabilizing charging circuit, a boost charging circuit, or a switched capacitor charging circuit; and the charger unit is configured to charge the first battery by using the direct current signal from the rectifier. For the stylus, energy is coupled from the coil, passes through the chip, and then is directly output to a battery of the stylus.

15 Claims, 15 Drawing Sheets

(51) Int. Cl.
*G06F 3/02* (2006.01)
*G06F 3/0354* (2013.01)
*G06F 3/04842* (2022.01)
*G06F 3/04883* (2022.01)
*G06F 40/166* (2020.01)
*H02J 7/34* (2006.01)
*H02J 50/10* (2016.01)
*H02J 50/80* (2016.01)

(52) U.S. Cl.
CPC ............ *G06F 3/038* (2013.01); *G06F 3/0383* (2013.01); *G06F 3/04842* (2013.01); *G06F 3/04883* (2013.01); *G06F 40/166* (2020.01); *H02J 7/342* (2020.01); *H02J 50/10* (2016.02); *H02J 50/80* (2016.02); *G06F 2203/0384* (2013.01)

(58) Field of Classification Search
CPC .... G06F 3/0441; G06F 1/1641; G06F 1/1652; G06F 3/0442; G06F 3/04184; G06F 3/04162; G06F 2203/04102
See application file for complete search history.

(56) References Cited

U.S. PATENT DOCUMENTS

| | | |
|---|---|---|
| 2017/0025887 A1 | 1/2017 | Hyun et al. |
| 2017/0357338 A1 | 12/2017 | Bell |
| 2018/0246587 A1 | 8/2018 | Dekel |
| 2020/0052520 A1 | 2/2020 | Byunghoon et al. |
| 2021/0044132 A1 | 2/2021 | Kristjansson |
| 2022/0155878 A1 | 5/2022 | Changbyung et al. |
| 2023/0125764 A1* | 4/2023 | Kim ..................... G06F 3/0383 345/173 |

FOREIGN PATENT DOCUMENTS

| | | |
|---|---|---|
| CN | 205319805 U | 6/2016 |
| CN | 206021625 U | 3/2017 |
| CN | 108649672 A | 10/2018 |
| CN | 208094236 U | 11/2018 |
| CN | 208873125 U | 5/2019 |
| CN | 112104243 A | 12/2020 |
| CN | 113178900 A | 7/2021 |
| EP | 3608761 A1 | 2/2020 |
| JP | 2021027712 A | 2/2021 |
| WO | 2021025493 A1 | 2/2021 |

* cited by examiner

WIRELESS CHARGING SYSTEM, CHIP, AND WIRELESS CHARGING CIRCUIT

CROSS-REFERENCE TO RELATED APPLICATIONS

This application is a National Stage of International Application No. PCT/CN2022/074400, filed on Jan. 27, 2022, which claims priority to Chinese Patent Application No. 202110348557.4, filed on Mar. 31, 2021, and Chinese Patent Application No. 202110293428.X, filed on Mar. 15, 2021. The disclosures of all the aforementioned applications are incorporated herein by reference in their entireties.

TECHNICAL FIELD

Embodiments of this application relate to the field of wireless charging technologies, and in particular, to a wireless charging system, a chip, and a wireless charging circuit.

BACKGROUND

The wireless charging technology originates from the wireless power transfer technology, and its principle is that energy is transferred through magnetic fields between a charger and an electric apparatus. Specifically, the charger can generate an electromagnetic signal, and the electric apparatus can sense the electromagnetic signal, so that the electric apparatus can generate current to charge a battery. Wireless charging is widely applied to existing electronic devices because it does not require additional wires and other accessories.

For example, in the field of stylus pens, the charger may be a wireless keyboard or an electronic device, and an electric device may be a stylus. The stylus can be wirelessly charged by using the wireless keyboard or electronic device.

However, existing wireless charging products always have the problem of low charging efficiency.

SUMMARY

Embodiments of this application provide a wireless charging system, a chip, and a wireless charging circuit, so as to shorten a wireless charging link and improve link efficiency.

According to a first aspect, an embodiment of this application provides a wireless charging system, including an electronic device and a stylus. The stylus may also be referred to as a stylus pen or the like.

Specifically, the electronic device is configured to wirelessly charge the stylus; and the stylus includes a wireless charging circuit. The wireless charging circuit includes a first coil, a chip, and a first battery, where the first coil is configured to be coupled to the second coil to obtain an alternating current signal, and the chip is configured to charge the first battery based on the alternating current signal; where a charger unit includes: a voltage-stabilizing charging circuit, a boost charging circuit, or a switched capacitor charging circuit. The chip includes a rectifier, the charger unit, a micro-control unit, and a protocol encoding/decoding unit. The rectifier is configured to rectify an input alternating current signal into a direct current signal; the charger unit is configured to charge the first battery by using the direct current signal from the rectifier; the protocol encoding/decoding unit is configured to communicate with a transmit chip; and the micro-control unit is configured to control the charger unit and the protocol encoding/decoding unit.

In this embodiment of this application, an RX chip and a charger chip of the stylus can be designed as one component. Energy is coupled from the coil in the stylus, passes through the component, and then is directly output to a battery of the stylus, thereby shortening a wireless charging link and improving link efficiency. This can reduce temperature rise of the stylus during charging and improve charging efficiency.

In a possible design, the voltage-stabilizing charging circuit includes a first field effect transistor control module, a first field effect transistor, and a second field effect transistor, where a gate terminal of the first field effect transistor and a gate terminal of the second field effect transistor are both connected to the first field effect transistor control module, a source terminal of the first field effect transistor is connected to an output terminal of the rectifier, a drain terminal of the first field effect transistor is connected to a source terminal of the second field effect transistor, and a drain terminal of the second field effect transistor is used to charge a battery of the stylus.

In this way, the chip includes an LDO charger, and the LDO charger includes a relatively small quantity of field effect transistors and has a relatively simple structure.

In a possible design, the voltage-stabilizing charging circuit includes a second field effect transistor control module, a third field effect transistor, a fourth field effect transistor, and a fifth field effect transistor, where a gate terminal of the third field effect transistor, a gate terminal of the fourth field effect transistor, and a gate terminal of the fifth field effect transistor are all connected to the second field effect transistor control module, a source terminal of the third field effect transistor is connected to an output terminal of the rectifier, a drain terminal of the third field effect transistor is connected to a source terminal of the fourth field effect transistor and one end of an inductor L, a drain terminal of the fourth field effect transistor is connected to a source terminal of the fifth field effect transistor and the other end of the inductor L, and a drain terminal of the fifth field effect transistor is configured to charge a battery of the stylus.

In this way, the chip includes a buck charger, and the buck charger has a larger quantity of field effect transistors than the LDO charger. With the third field effect transistor, the fourth field effect transistor, and the inductor L, flexible and stable voltage conversion can be implemented, achieving relatively high efficiency.

In a possible design, the voltage-stabilizing charging circuit includes a third field effect transistor control module, a sixth field effect transistor, a seventh field effect transistor, an eighth field effect transistor, a ninth field effect transistor, a tenth field effect transistor, an eleventh field effect transistor, a twelfth field effect transistor, a thirteenth field effect transistor, and a fourteenth field effect transistor.

A gate terminal of each of the sixth field effect transistor, the seventh field effect transistor, the eighth field effect transistor, the ninth field effect transistor, the tenth field effect transistor, the eleventh field effect transistor, the twelfth field effect transistor, the thirteenth field effect transistor, and the fourteenth field effect transistor is connected to the third field effect transistor control module; and a source terminal of the sixth field effect transistor is connected to an output terminal of the rectifier, a drain terminal of the sixth field effect transistor is connected to a source terminal of the seventh field effect transistor and a source terminal of the eleventh field effect transistor, a drain terminal of the seventh field effect transistor is connected to a source terminal of the eighth field effect transistor and one end of a capacitor C1, and a drain terminal of the eighth field effect transistor is connected to a source terminal of the ninth field effect transistor, a drain terminal of the twelfth field effect transistor is connected to a source terminal of the thirteenth field effect transistor, a drain terminal of the ninth field effect transistor is connected to a source terminal of the tenth field effect transistor and the other end of the capacitor C1, a drain terminal of the tenth field effect transistor and a drain terminal of the fourteenth field effect transistor are both grounded, a drain terminal of the eleventh field effect transistor is connected to a source terminal of the twelfth field effect transistor and one end of a capacitor C2, a drain terminal of the twelfth field effect transistor is connected to a source terminal of the thirteenth field effect transistor, and a drain terminal of the thirteenth field effect transistor is connected to a source terminal of the fourteenth field effect transistor and the other end of the capacitor C2, where the drain terminal of the eighth field effect transistor being connected to the drain terminal of the twelfth field effect transistor is used to charge a battery of the stylus.

In a possible design, the electronic device includes a second battery, a boost chip, a transmit chip, and the second coil, where the second battery is configured to input voltage to the boost chip; the boost chip is configured to boost the voltage to obtain a first direct current signal; the transmit chip is configured to invert the first direct current signal into a first alternating current signal, and transmit the first alternating current signal to the second coil; and the second coil is configured to be coupled to the first coil by using the first alternating current signal. In this way, the electronic device can be used to charge the stylus.

In one possible design, the electronic device is a tablet computer or a wireless keyboard, applied to use scenarios of the stylus.

According to a second aspect, an embodiment of this application provides a chip, including a rectifier, a charger unit, a micro-control unit, and a protocol encoding/decoding unit. The rectifier is configured to rectify an input alternating current signal into a direct current signal; the charger unit is configured to charge a battery by using the direct current signal from the rectifier, where the charger unit includes a voltage-stabilizing charging circuit, a boost charging circuit, or a switched capacitor charging circuit; the protocol encoding/decoding unit is configured to communicate with a transmit chip; and the micro-control unit is configured to control the charger unit and the protocol encoding/decoding unit.

In a possible design, the voltage-stabilizing charging circuit includes a first field effect transistor control module, a first field effect transistor, and a second field effect transistor, where a gate terminal of the first field effect transistor and a gate terminal of the second field effect transistor are both connected to the first field effect transistor control module, a source terminal of the first field effect transistor is connected to an output terminal of the rectifier, a drain terminal of the first field effect transistor is connected to a source terminal of the second field effect transistor, and a drain terminal of the second field effect transistor is used to charge a battery of the stylus.

In a possible design, the voltage-stabilizing charging circuit includes a second field effect transistor control module, a third field effect transistor, a fourth field effect transistor, and a fifth field effect transistor, where a gate terminal of the third field effect transistor, a gate terminal of the fourth field effect transistor, and a gate terminal of the fifth field effect transistor are all connected to the second field effect transistor control module, a source terminal of the third field effect transistor is connected to an output terminal of the rectifier, a drain terminal of the third field effect transistor is connected to a source terminal of the fourth field effect transistor and one end of an inductor L, a drain terminal of the fourth field effect transistor is connected to a source terminal of the fifth field effect transistor and the other end of the inductor L, and a drain terminal of the fifth field effect transistor is configured to charge a battery of the stylus.

In a possible design, the voltage-stabilizing charging circuit includes a third field effect transistor control module, a sixth field effect transistor, a seventh field effect transistor, an eighth field effect transistor, a ninth field effect transistor, a tenth field effect transistor, an eleventh field effect transistor, a twelfth field effect transistor, a thirteenth field effect transistor, and a fourteenth field effect transistor. A gate terminal of each of the sixth field effect transistor, the seventh field effect transistor, the eighth field effect transistor, the ninth field effect transistor, the tenth field effect transistor, the eleventh field effect transistor, the twelfth field effect transistor, the thirteenth field effect transistor, and the fourteenth field effect transistor is connected to the third field effect transistor control module; and a source terminal of the sixth field effect transistor is connected to an output terminal of the rectifier, a drain terminal of the sixth field effect transistor is connected to a source terminal of the seventh field effect transistor and a source terminal of the eleventh field effect transistor, a drain terminal of the seventh field effect transistor is connected to a source terminal of the eighth field effect transistor and one end of a capacitor C1, and a drain terminal of the eighth field effect transistor is connected to a source terminal of the ninth field effect transistor, a drain terminal of the twelfth field effect transistor is connected to a source terminal of the thirteenth field effect transistor, a drain terminal of the ninth field effect transistor is connected to a source terminal of the tenth field effect transistor and the other end of the capacitor C1, a drain terminal of the tenth field effect transistor and a drain terminal of the fourteenth field effect transistor are both grounded, a drain terminal of the eleventh field effect transistor is connected to a source terminal of the twelfth field effect transistor and one end of a capacitor C2, a drain terminal of the twelfth field effect transistor is connected to a source terminal of the thirteenth field effect transistor, and a drain terminal of the thirteenth field effect transistor is connected to a source terminal of the fourteenth field effect transistor and the other end of the capacitor C2, where the drain terminal of the eighth field effect transistor being connected to the drain terminal of the twelfth field effect transistor is used to charge a battery of the stylus.

According to a third aspect, an embodiment of this application provides a wireless charging circuit applied to a stylus. The wireless charging circuit includes a first coil, a chip, and a first battery, where the first coil is configured to be coupled to the second coil to obtain an alternating current signal, and the chip is configured to charge the first battery based on the alternating current signal. The chip includes a rectifier, a charger unit, a micro-control unit, and a protocol encoding/decoding unit. The rectifier is configured to rectify an input alternating current signal into a direct current signal. The charger unit is configured to charge the first battery by using the direct current signal from the rectifier, and the charger unit includes a voltage-stabilizing charging circuit, a boost charging circuit, or a switched capacitor charging circuit. The protocol encoding/decoding unit is configured to communicate with a transmit chip. The micro-control unit is configured to control the charger unit and the protocol encoding/decoding unit.

In a possible design, the voltage-stabilizing charging circuit includes a first field effect transistor control module, a first field effect transistor, and a second field effect transistor, where a gate terminal of the first field effect transistor and a gate terminal of the second field effect transistor are both connected to the first field effect transistor control module, a source terminal of the first field effect transistor is connected to an output terminal of the rectifier, a drain terminal of the first field effect transistor is connected to a source terminal of the second field effect transistor, and a drain terminal of the second field effect transistor is used to charge a battery of the stylus.

In a possible design, the voltage-stabilizing charging circuit includes a second field effect transistor control module, a third field effect transistor, a fourth field effect transistor, and a fifth field effect transistor, where a gate terminal of the third field effect transistor, a gate terminal of the fourth field effect transistor, and a gate terminal of the fifth field effect transistor are all connected to the second field effect transistor control module, a source terminal of the third field effect transistor is connected to an output terminal of the rectifier, a drain terminal of the third field effect transistor is connected to a source terminal of the fourth field effect transistor and one end of an inductor L, a drain terminal of the fourth field effect transistor is connected to a source terminal of the fifth field effect transistor and the other end of the inductor L, and a drain terminal of the fifth field effect transistor is configured to charge a battery of the stylus.

In a possible design, the voltage-stabilizing charging circuit includes a third field effect transistor control module, a sixth field effect transistor, a seventh field effect transistor, an eighth field effect transistor, a ninth field effect transistor, a tenth field effect transistor, an eleventh field effect transistor, a twelfth field effect transistor, a thirteenth field effect transistor, and a fourteenth field effect transistor. A gate terminal of each of the sixth field effect transistor, the seventh field effect transistor, the eighth field effect transistor, the ninth field effect transistor, the tenth field effect transistor, the eleventh field effect transistor, the twelfth field effect transistor, the thirteenth field effect transistor, and the fourteenth field effect transistor is connected to the third field effect transistor control module; and a source terminal of the sixth field effect transistor is connected to an output terminal of the rectifier, a drain terminal of the sixth field effect transistor is connected to a source terminal of the seventh field effect transistor and a source terminal of the eleventh field effect transistor, a drain terminal of the seventh field effect transistor is connected to a source terminal of the eighth field effect transistor and one end of a capacitor C1, and a drain terminal of the eighth field effect transistor is connected to a source terminal of the ninth field effect transistor, a drain terminal of the twelfth field effect transistor is connected to a source terminal of the thirteenth field effect transistor, a drain terminal of the ninth field effect transistor is connected to a source terminal of the tenth field effect transistor and the other end of the capacitor C1, a drain terminal of the tenth field effect transistor and a drain terminal of the fourteenth field effect transistor are both grounded, a drain terminal of the eleventh field effect transistor is connected to a source terminal of the twelfth field effect transistor and one end of a capacitor C2, a drain terminal of the twelfth field effect transistor is connected to a source terminal of the thirteenth field effect transistor, and a drain terminal of the thirteenth field effect transistor is connected to a source terminal of the fourteenth field effect transistor and the other end of the capacitor C2, where the drain terminal of the eighth field effect transistor being connected to the drain terminal of the twelfth field effect transistor is used to charge a battery of the stylus.

For beneficial effects in the second aspect, the third aspect, and the possible designs thereof, reference may be made to beneficial effects in the first aspect and the possible implementations of the first aspect, and details are not repeated herein.

DETAILED DESCRIPTION OF ILLUSTRATIVE EMBODIMENTS

Unless otherwise specified, "plurality of" in this specification indicates two or more. The term "and/or" in this specification describes only an association relationship for describing associated objects and represents that three relationships may exist. For example, A and/or B may represent the following three cases: A alone, both A and B, and B alone. In addition, the character "/" in this specification generally represents an "or" relationship between associated objects. In a formula, the character "/" indicates a "division" relationship between the associated objects.

It should be understood that digital numbers in the embodiments of this application are merely for differentiation for ease of description and are not intended to limit the scope of the embodiments of this application.

It should be understood that, in the embodiments of this application, sequence numbers of the foregoing processes do not indicate execution sequences. The execution sequences of the processes should be determined according to functions and internal logic of the processes and should not be construed as any limitation on the implementation processes of the embodiments of this application.

Figure 1:
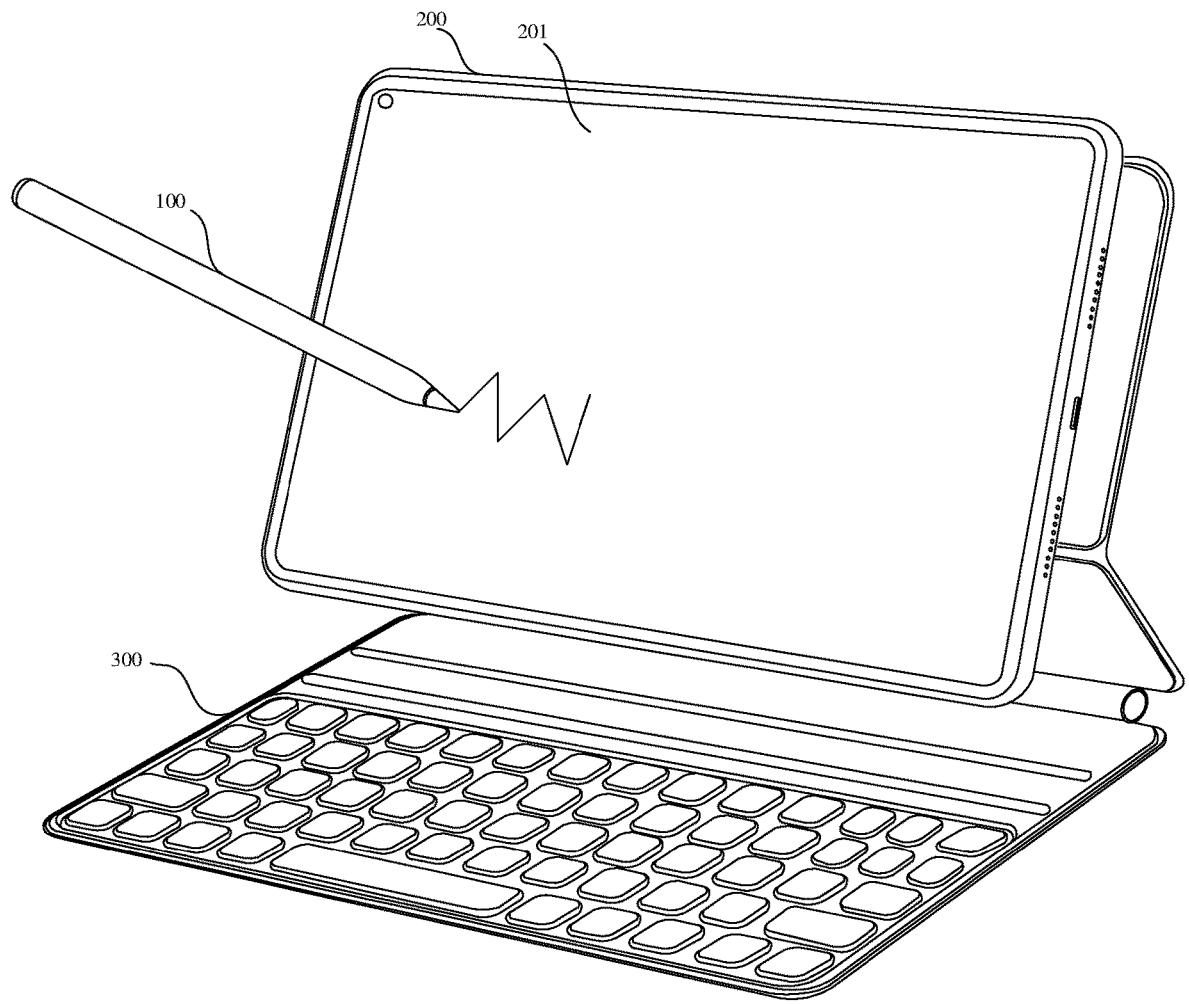
FIG. 1 is a schematic diagram of a scenario to which embodiments of this application are applicable.

FIG. 1 is a schematic diagram of a scenario to which the embodiments of this application are applicable. Referring to FIG. 1, the scenario includes a stylus (stylus) 100, an electronic device 200, and a wireless keyboard 300. In FIG. 1, a tablet computer (tablet) is used as an example of the electronic device 200 for description. The stylus 100 and the wireless keyboard 300 may provide input to the electronic device 200, and in response to the input, the electronic device 200 performs an operation based on the input of the stylus 100 or the wireless keyboard 300. A touch region may be provided on the wireless keyboard 300, the stylus 100 may operate in the touch region of the wireless keyboard 300 to provide input to the wireless keyboard 300, and in response to the input, the wireless keyboard 300 may perform an operation based on the input of the stylus 100. In an embodiment, the stylus 100 and the electronic device 200, the stylus 100 and the wireless keyboard 300, and the electronic device 200 and the wireless keyboard 300 may be interconnected through a communication network to implement wireless signal exchange. The communication network may be, but is not limited to, a Wi-Fi hotspot network, a Wi-Fi peer-to-peer (peer-to-peer, P2P) network, a bluetooth network, a zigbee network, or a near field communication (near field communication, NFC) network, and other near field communication networks.

The stylus 100 may be, but is not limited to, an inductive stylus and a capacitive stylus. The electronic device 200 has a touchscreen 201. When the stylus 100 is an inductive stylus, an electromagnetic induction board needs to be integrated on the touchscreen 201 of the electronic device 200 that interacts with the stylus 100. Coils are distributed on the electromagnetic induction board, and coils are also integrated in the inductive stylus. Based on the principle of electromagnetic induction, within a range of a magnetic field generated by the electromagnetic induction board, the inductive stylus can accumulate and store electric energy with movement of the inductive stylus. The inductive stylus may transmit the accumulated electric energy to the electromagnetic induction board via the coils in the inductive stylus through free oscillation. The electromagnetic induction board may scan the coils on the electromagnetic induction board based on the electric energy from the inductive stylus to calculate a position of the inductive stylus on the touchscreen 201. The touchscreen 201 in the electronic device 200 may also be referred to as a touch panel, and the stylus 100 may also be referred to as a stylus pen.

The capacitive stylus may include a passive capacitive stylus and an active capacitive stylus. The passive capacitive stylus may be called a passive-type capacitive stylus, and the active capacitive stylus may be called an active-type capacitive stylus.

One or more electrodes may be provided in the active capacitive stylus (for example, in the tip of the stylus), and the active capacitive stylus may transmit a signal through the electrode. When the stylus 100 is an active capacitive stylus, an electrode array needs to be integrated on the touchscreen 201 of the electronic device 200 that interacts with the stylus 100. In an embodiment, the electrode array may be a capacitive electrode array. The electronic device 200 may receive a signal from the active capacitive stylus through the electrode array; and when receiving the signal, the electronic device 200 further recognizes a position of the active capacitive stylus on the touchscreen and an inclination angle of the active capacitive stylus based on change of a capacitance value on the touchscreen 201.

Figure 2A:
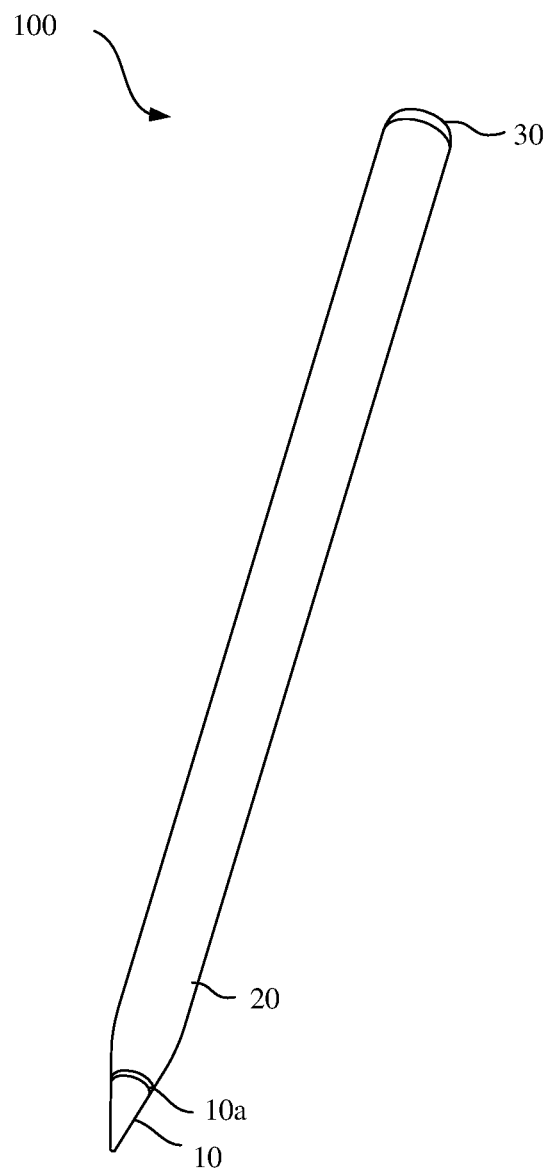
FIG. 2A is a schematic structural diagram of a stylus according to an embodiment of this application.

FIG. 2A is a schematic structural diagram of a stylus according to an embodiment of this application. Referring to FIG. 2A, the stylus 100 may include a tip 10, a barrel 20, and a back cover 30. The barrel 20 is hollowed inside, the tip 10 and the back cover 30 are located at two ends of the barrel 20 respectively, and the back cover 30 and the barrel 20 may be plugged or buckled. For a matching relationship between the tip 10 and the barrel 20, refer to the description in FIG. 2B.

Figure 2B:
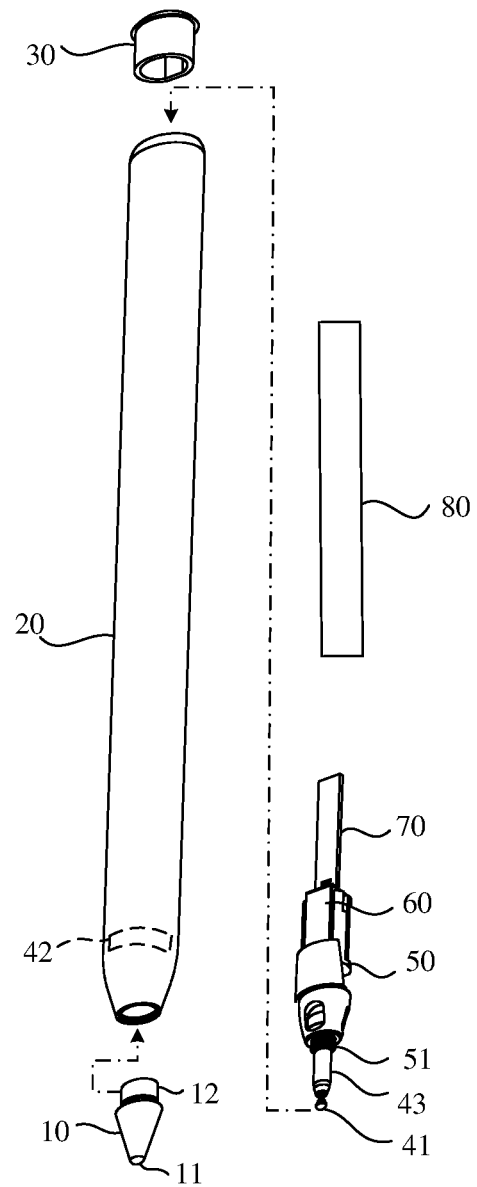
FIG. 2B is a schematic diagram of a partially disassembled structure of a stylus according to an embodiment of this application.

FIG. 2B is a schematic diagram of a partially disassembled structure of a stylus according to an embodiment of this application. Referring to FIG. 2B, the stylus 100 further includes a mainshaft assembly 50, the mainshaft assembly 50 is located in the barrel 20, and the mainshaft assembly 50 is slidably disposed in the barrel 20. The mainshaft assembly 50 has an external thread 51, and the tip 10 includes a writing end 11 and a connecting end 12, where the connecting end 12 of the tip 10 has an internal thread (not shown) matching the external thread 51.

When the mainshaft assembly 50 is assembled into the barrel 20, the connecting end 12 of the tip 10 extends into the barrel 20 and is threadedly connected to the external thread 51 of the mainshaft assembly 50. In some other examples, the connecting end 12 of the tip 10 may alternatively be detachably connected to the mainshaft assembly 50 through buckling or the like. The connecting end 12 of the tip 10 being detachably connected to the mainshaft assembly 50 can implement replacement of the tip 10.

For detection of a pressure on the writing end 11 of the tip 10, as shown in FIG. 2A, there is a gap 10a between the tip 10 and the barrel 20, which can ensure that when the writing end 11 of the tip 10 is subjected to external force, the tip 10 may move toward the barrel 20, and the movement of the tip 10 drives the mainshaft assembly 50 to move within the barrel 20. For detection of the external force, as shown in FIG. 2B, the mainshaft assembly 50 is provided with a pressure sensitive assembly 60, part of the pressure sensitive assembly 60 is fixedly connected to a fixing structure in the barrel 20, and part of the pressure sensitive assembly 60 is fixedly connected to the mainshaft assembly 50. In this way, when the mainshaft assembly 50 moves with the tip 10, because part of the pressure sensitive assembly 60 is fixedly connected to the fixing structure in the barrel 20, movement of the mainshaft assembly 50 causes the pressure sensitive assembly 60 to deform, and deformation of the pressure sensitive assembly 60 is transferred to a circuit board 70 (for example, the pressure sensitive assembly 60 and the circuit board 70 may be electrically connected via a wire or a flexible circuit board), the circuit board 70 detects the pressure on the writing end 11 of the tip 10 based on the deformation of the pressure sensitive assembly 60, so as to control line thickness of the writing end 11 based on the pressure on the writing end 11 of the tip 10.

It should be noted that the pressure detection of the tip 10 includes but is not limited to the foregoing method. For example, a pressure sensor may be provided in the writing end 11 of the tip 10, and the pressure on the tip 10 may be detected by the pressure sensor.

In this embodiment, as shown in FIG. 2B, the stylus 100 further includes a plurality of electrodes, and the plurality of electrodes may be, for example, a first emission electrode 41, a ground electrode 43, and a second emission electrode 42. The first emission electrode 41, the ground electrode 43, and the second emission electrode 42 are all electrically connected to the circuit board 70. The first emission electrode 41 may be located within the tip 10 and close to the writing end 11, and the circuit board 70 may be configured as a control board that can separately provide a signal to the first emission electrode 41 and the second emission electrode 42. The first emission electrode 41 is configured to emit a first signal, and when the first emission electrode 41 is close to the touchscreen 201 of the electronic device 200, a coupling capacitor may be formed between the first emission electrode 41 and the touchscreen 201 of the electronic device 200, so that the electronic device 200 can receive the first signal. The second emission electrode 42 is configured to emit a second signal, and the electronic device 200 may determine an angle of inclination of the stylus 100 based on the received second signal. In this embodiment of this application, the second emission electrode 42 may be located on an inner wall of the barrel 20. In an example, the second emission electrode 42 may alternatively be located on the mainshaft assembly 50.

The ground electrode 43 may be located between the first emission electrode 41 and the second emission electrode 42, or the ground electrode 43 may be located around an outer periphery of the first emission electrode 41 and the second emission electrode 42, and the ground electrode 43 is configured to reduce coupling between the first emission electrode 41 and the second emission electrode 42.

When the electronic device 200 receives the first signal from the stylus 100, a capacitance value at a corresponding position of the touchscreen 201 changes. Accordingly, the electronic device 200 may determine a position of the stylus 100 (or the tip of the stylus 100) on the touchscreen 201 based on the change of the capacitance value on the touchscreen 201. In addition, the electronic device 200 may obtain the angle of inclination of the stylus 100 by using a double-tip projection method in an inclination angle detection algorithm. Positions of the first emission electrode 41 and the second emission electrode 42 in the stylus 100 are different. Therefore, when the electronic device 200 receives the first signal and the second signal from the stylus 100, capacitance values at the two positions on the touchscreen 201 change. The electronic device 200 may obtain the angle of inclination of the stylus 100 based on a distance between the first emission electrode 41 and the second emission electrode 42 and a distance between two positions with capacitance values changed on the touchscreen 201. For more details about how the angle of inclination of the stylus 100 is obtained, reference may be made to related descriptions of a dual-tip projection method in the prior art.

In this embodiment of this application, as shown in FIG. 2B, the stylus 100 further includes a battery assembly 80, where the battery assembly 80 is configured to provide power to the circuit board 70. The battery assembly 80 may include a lithium-ion battery, or the battery assembly 80 may include a nickel-chromium battery, an alkaline battery, a nickel-metal hydride battery, or the like. In an embodiment, the battery included in the battery assembly 80 may be a rechargeable battery or a disposable battery. When the battery included in the battery assembly 80 is a rechargeable battery, the stylus 100 supports wireless charging for the battery in the battery assembly 80.

Figure 3:
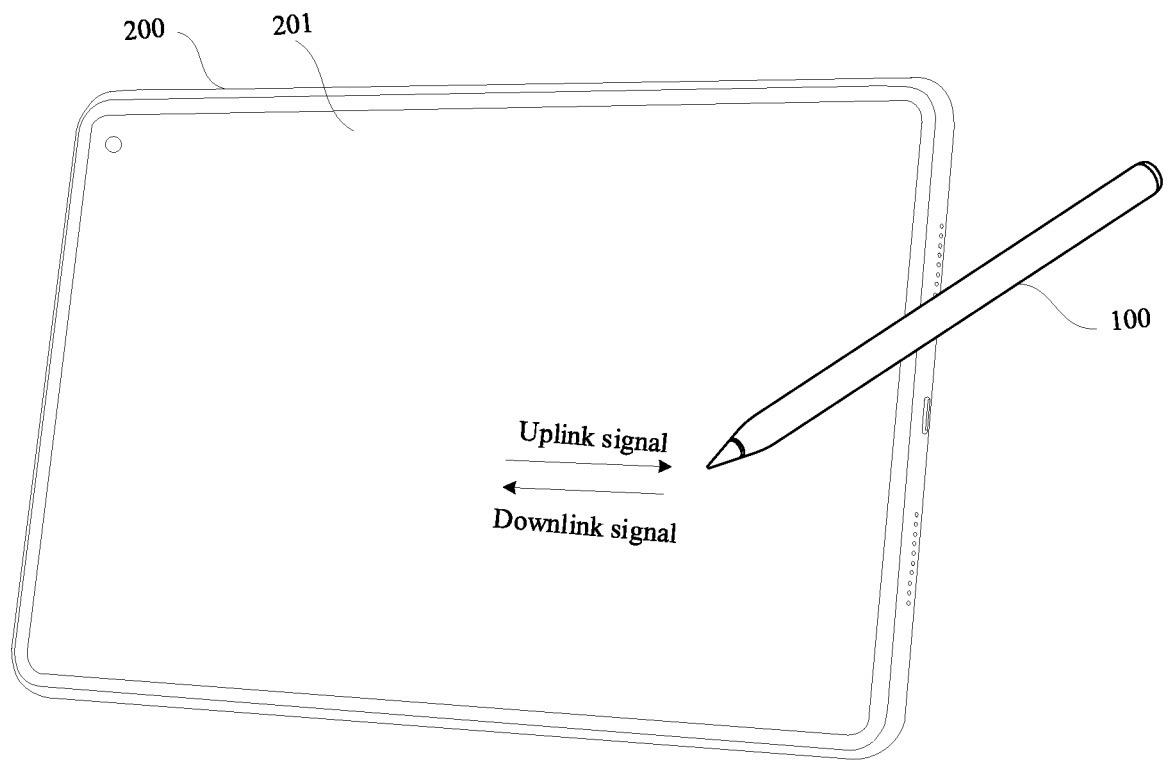
FIG. 3 is a schematic diagram of interaction between a stylus and an electronic device according to an embodiment of this application.

When the stylus 100 is an active capacitive stylus, referring to FIG. 3, after the electronic device 200 and the stylus 100 are wirelessly connected, the electronic device 200 may transmit an uplink signal to the stylus 100 through the electrode array integrated on the touchscreen 201. The stylus 100 may receive the uplink signal through a receiving electrode, and the stylus 100 may transmit a downlink signal through an emission electrode (for example, the first emission electrode 41 and the second emission electrode 42). The downlink signal includes the foregoing first signal and second signal. When the tip 10 of the stylus 100 comes in contact with the touchscreen 201, a capacitance value at a corresponding position of the touchscreen 201 changes, and the electronic device 200 may determine a position of the tip 10 of the stylus 100 on the touchscreen 201 based on the capacitance value on the touchscreen 201. In an embodiment, the uplink signal and the downlink signal may be square wave signals.

Figure 4:
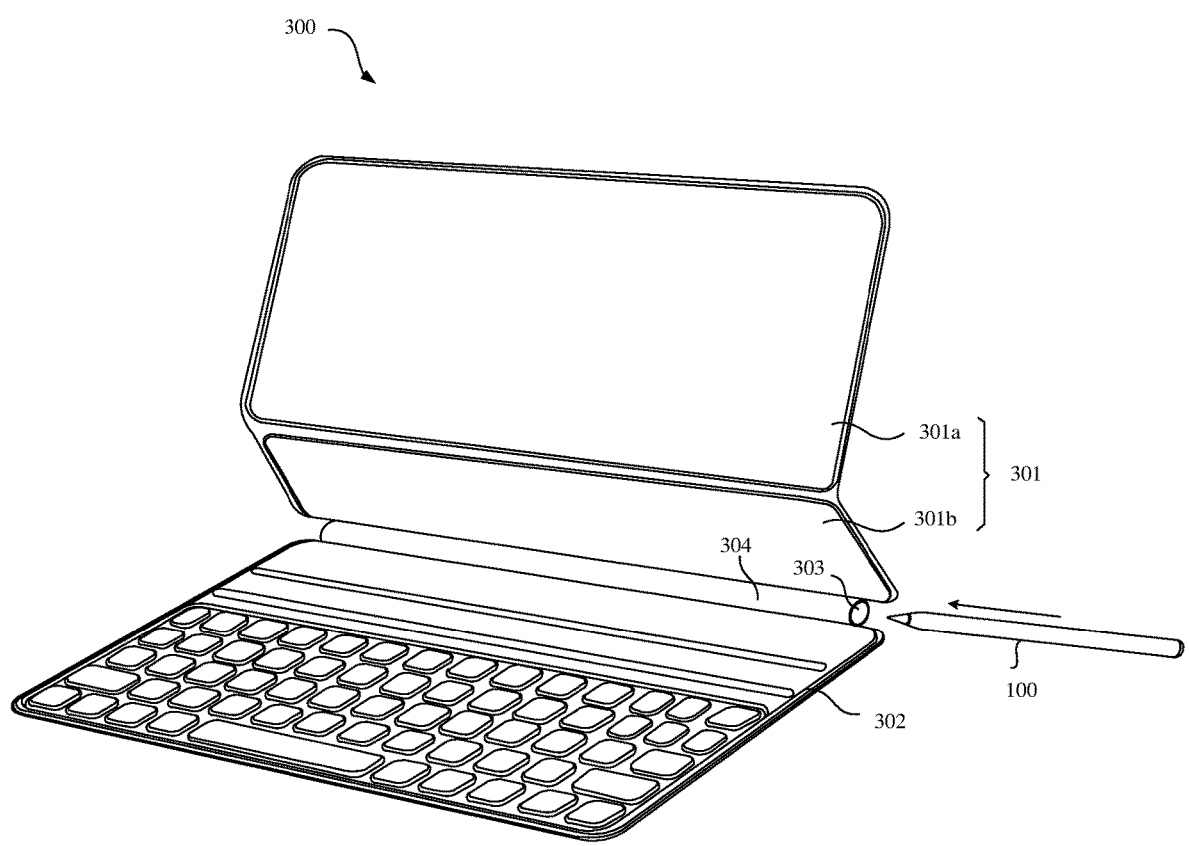
FIG. 4 is a schematic diagram of assembly of a stylus and a wireless keyboard according to an embodiment of this application.

In an embodiment, referring to FIG. 4, the wireless keyboard 300 may include a first part 301 and a second part 302. For example, the wireless keyboard 300 may include a keyboard body and a keyboard cover. The first part 301 may be the keyboard cover, and the second part 302 may be the keyboard body. The first part 301 is configured to hold the electronic device 200, and the second part 302 may be provided with keys, a touch panel, and the like for user operation.

When the wireless keyboard 300 is in use, the first part 301 and the second part 302 of the wireless keyboard 300 need to be opened; and when the wireless keyboard 300 is not in use, the first part 301 and the second part 302 of the wireless keyboard 300 can be closed. In an embodiment, the first part 301 and the second part 302 of the wireless keyboard 300 are rotatably connected. For example, the first part 301 and the second part 302 may be connected through a rotating shaft or a hinge; or in some examples, the first part 301 and the second part 302 are rotatably connected through a flexible material (for example, a leather material or a cloth material). Alternatively, in some examples, the first part 301 and the second part 302 may be integrally formed, and a joint between the first part 301 and the second part 302 is processed by thinning, so that the joint between the first part 301 and the second part 302 may be bent. The first part 301 and the second part 302 may be connected in, without limitation to, the foregoing rotatable connection manners.

The first part 301 may include at least two brackets that are rotatably connected. For example, referring to FIG. 4, the first part 301 includes a first bracket 301a and a second bracket 301b. The first bracket 301a is rotatably connected to the second bracket 301b. During use of the electronic device 200, both the first bracket 301a and the second bracket 301b may be used to support the electronic device 200 (refer to FIG. 1). Alternatively, the first bracket 30a supports the second bracket 301b, and the second bracket 301b supports the electronic device 200. Referring to FIG. 4, the second bracket 301b and the second part 302 are rotatably connected.

Referring to FIG. 4, to accommodate the stylus 100, the wireless keyboard 300 may be provided with an accommodating portion 303 for accommodating the stylus 100. Referring to FIG. 4, the accommodating portion 303 is a cylindrical chamber. When being accommodated, the stylus 100 is inserted into the accommodating chamber in a direction of the arrow in FIG. 4. In this embodiment, referring to FIG. 4, the second part 302 and the second bracket 301b are rotatably connected by using a connecting portion 304, and the connecting portion 304 is provided with the accommodating portion 303. The connecting portion 304 may be a rotating shaft.

Figure 5A:
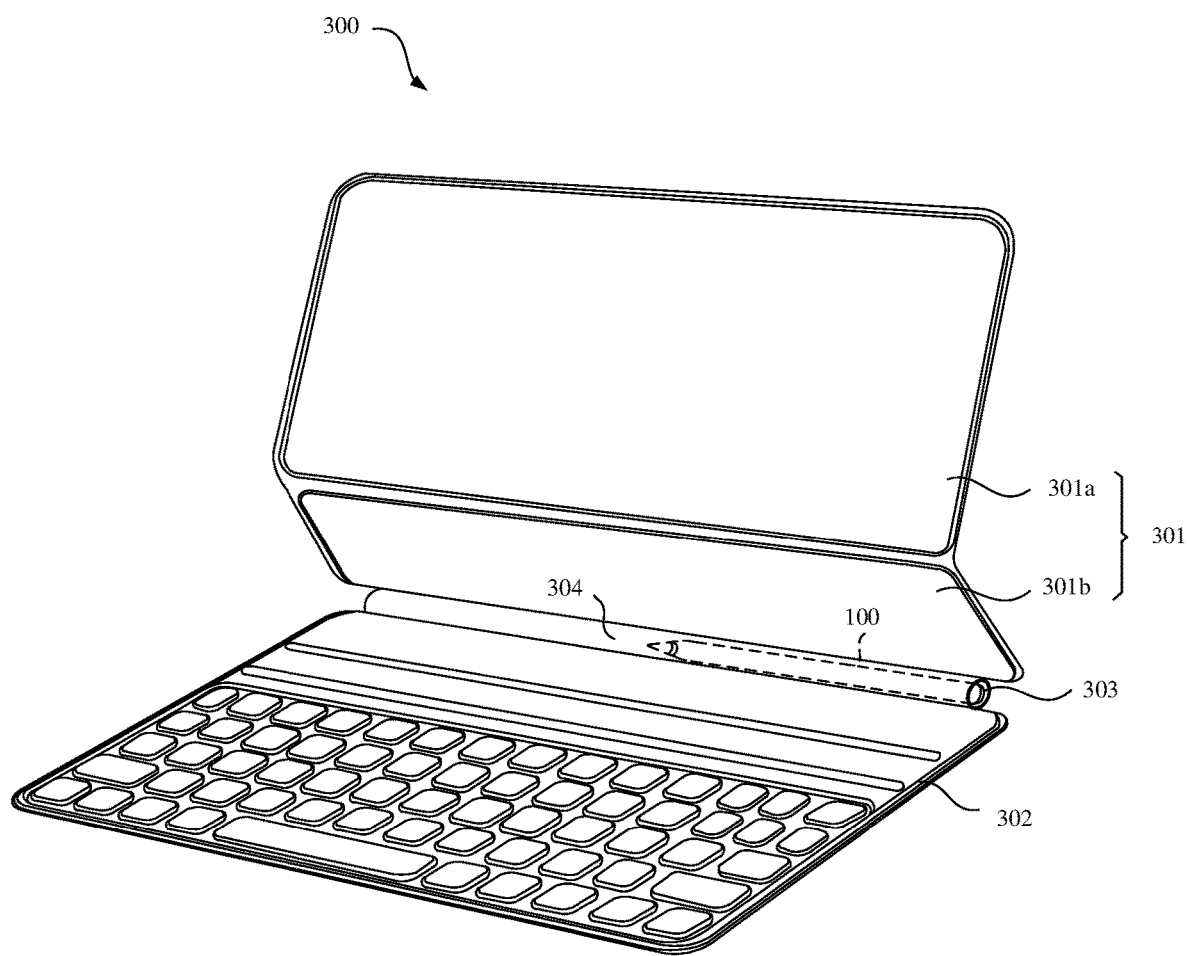
FIG. 5A is a schematic diagram of a stylus being accommodated in an accommodating portion of a wireless keyboard according to an embodiment of this application.
Figure 5B:
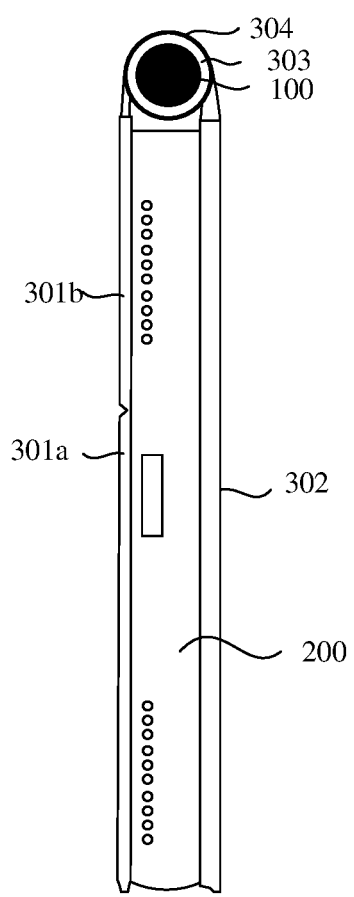
FIG. 5B is a schematic side view of a stylus being accommodated in an accommodating portion of a wireless keyboard according to an embodiment of this application.

FIG. 5A is a schematic diagram of a stylus being accommodated in an accommodating portion of a wireless keyboard according to an embodiment of this application; and FIG. 5B is a schematic side view of a stylus being accommodated in an accommodating portion of a wireless keyboard according to an embodiment of this application. Referring to FIG. 5B, the accommodating portion 303 is a circular chamber, and an inner diameter of the accommodating portion 303 is larger than an outer diameter of the stylus 100.

To prevent the stylus 100 from dropping from the accommodating portion 303, in an embodiment, a magnetic material may be provided on an inner wall of the accommodating portion 303, and a magnetic material may be provided in the stylus 100. The stylus 100 is adsorbed in the accommodating portion 303 by magnetic adsorption between the magnetic materials. Certainly, in some examples, the stylus 100 may be fastened to the accommodating portion 303 by, but not limited to, magnetic adsorption. For example, the stylus 100 may alternatively be fastened to the accommodating portion 303 by buckling.

To help the stylus 100 to be taken out of the accommodating portion 303, an eject structure may be provided in the accommodating portion 303. For example, when one end of the stylus 100 is pressed, an eject mechanism may drive that one end of the stylus 100 to eject from the accommodating portion 303.

Figure 6:
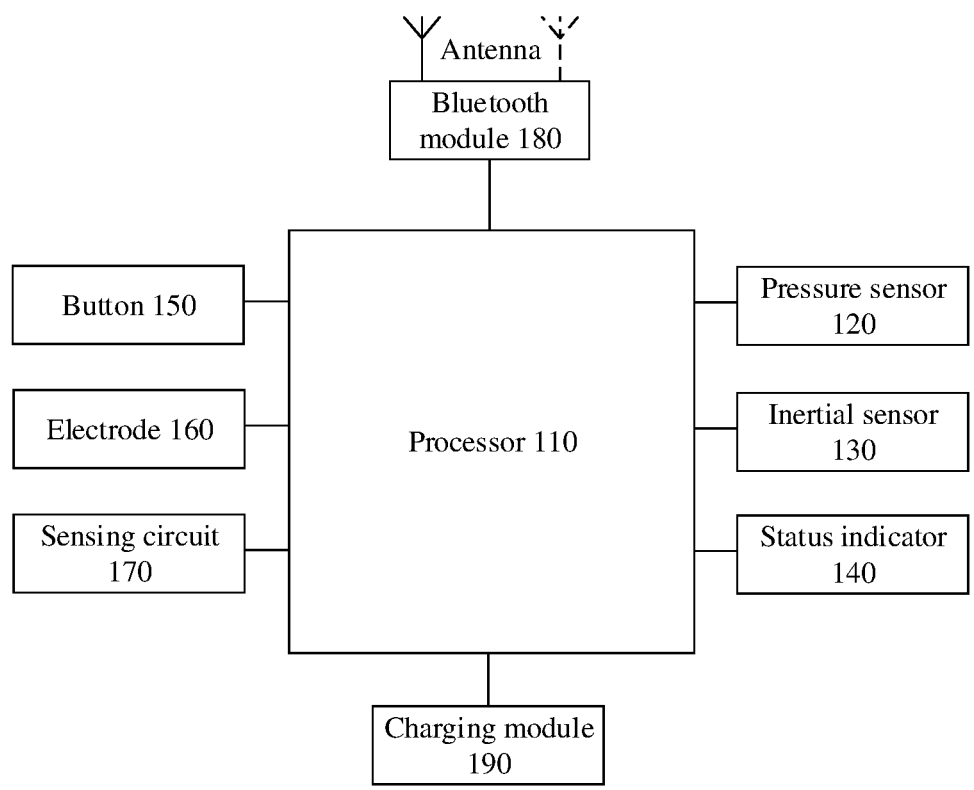
FIG. 6 is a schematic diagram of a hardware structure of a stylus according to an embodiment of this application.

FIG. 6 is a schematic diagram of a hardware structure of a stylus according to an embodiment of this application. Referring to FIG. 6, the stylus 100 may have a processor 110. The processor 110 may include a storage and processing circuit for supporting an operation of the stylus 100. The storage and processing circuit may include a storage apparatus such as a non-volatile memory (for example, a flash memory or another electrically programmable read-only memory configured as a solid state drive), a volatile memory (for example, a static or dynamic random access memory), and the like. The processing circuit in the processor 110 may be configured to control the operation of the stylus 100. The processing circuit may be based on one or more microprocessors, microcontrollers, digital signal processors, baseband processors, power management units, audio chips, application specific integrated circuits, and the like.

The stylus 100 may include one or more sensors. For example, the sensor may include a pressure sensor 120. The pressure sensor 120 may be disposed on the writing end 11 of the stylus 100 (as shown in FIG. 2B). Certainly, the pressure sensor 120 may alternatively be disposed in the barrel 20 of the stylus 100, so that after one end of the tip 10 of the stylus 100 is subjected to a force, the other end of the tip 10 moves so that the force acts on the pressure sensor 120. In an embodiment, the processor 110 may adjust, based on the pressure detected by the pressure sensor 120, the thickness of lines written using the tip 10 of the stylus 100.

The sensors may further include an inertial sensor 130. The inertial sensor 130 may include a three-axis accelerometer and a three-axis gyroscope, and/or other components for measuring movement of the stylus 100, for example, a three-axis magnetometer may be included in the sensor in a nine-axis inertial sensor structure. The sensors may further include additional sensors, such as a temperature sensor, an ambient light sensor, a light-based proximity sensor, a contact sensor, a magnetic sensor, a pressure sensor, and/or other sensors.

The stylus 100 may include a status indicator 140 such as a light emitting diode and a button 150. The status indicator 140 is configured to inform a user of a status of the stylus 100. The button 150 may include a mechanical button and a non-mechanical button, and the button 150 may be configured to collect press-button information from a user.

In this embodiment of this application, the stylus 100 may include one or more electrodes 160 (for details, refer to the descriptions in FIG. 2B). One of the electrodes 160 may be located at the writing end of the stylus 100, and one of the electrodes 160 may be located inside the tip 10. Reference may be made to the foregoing related descriptions.

The stylus 100 may include a sensing circuit 170. The sensing circuit 170 may sense capacitive coupling between the electrodes 160 and drive lines of a capacitive touch sensor panel that interacts with the stylus 100. The sensing circuit 170 may include an amplifier for receiving a capacitance reading from the capacitive touch sensor panel, a clock for generating a demodulation signal, a phase shifter for generating a phase shifted demodulation signal, a mixer for demodulating a capacitance reading by using an in-phase demodulation frequency component, and a mixer for demodulating a capacitance reading by using a quadrature demodulation frequency component. Results of demodulation by the mixers may be used for determining an amplitude proportional to a capacitance, so that the stylus 100 can sense contact with the capacitive touch sensor panel.

It can be understood that, according to an actual need, the stylus 100 may include a microphone, a speaker, an audio generator, a vibrator, a camera, a data port, and other devices. A user may use these devices to provide commands to control operations of the stylus 100 and the electronic device 200 that interacts with the stylus 100 and receive status information and other output.

The processor 110 may be configured to run software for controlling the operation of the stylus 100 in the stylus 100. During the operation of the stylus 100, the software running on the processor 110 may process sensor input, button input, and input from other devices to monitor movement of the stylus 100 and other user input. The software running on the processor 110 may detect a user command and may communicate with the electronic device 200.

To support wireless communication between the stylus 100 and the electronic device 200, the stylus 100 may include a wireless module. In FIG. 6, a bluetooth module 180 is used as an example of the wireless module for description. The wireless module may alternatively be a Wi-Fi hotspot module, a Wi-Fi peer-to-peer module, or the like. The bluetooth module 180 may include a radio frequency transceiver, such as a transceiver. The bluetooth module 180 may further include one or more antennas. The transceiver may transmit and/or receive a wireless signal by using the antenna. The wireless signal may be a bluetooth signal, a wireless local area network signal, a remote signal such as a cellular telephone signal, a near field communication signal, or other wireless signals based on a type of the wireless module.

The stylus 100 may further include a charging module 190, and the charging module 190 may support charging of the stylus 100 and provide power for the stylus 100.

It should be understood that the electronic device 200 in this embodiment of this application may be user equipment (user equipment, UE), a terminal (terminal), or the like. For example, the electronic device 200 may be a portable android device (portable android device, PAD), a personal digital assistant (personal digital assistant, PDA), a handheld device, a computing device, a vehicle-mounted device, or a wearable device with a wireless communication function, a mobile terminal or fixed terminal with a touchscreen such as a virtual reality (virtual reality, VR) terminal device, an augmented reality (augmented reality, AR) terminal device, a wireless terminal in industrial control (industrial control), a wireless terminal in self driving (self driving), a wireless terminal in remote medical (remote medical), a wireless terminal in a smart grid (smart grid), a wireless terminal in transportation safety (transportation safety), a wireless terminal in a smart city (smart city), or a wireless terminal in a smart home (smart home). The form of the terminal device is not specifically limited in the embodiments of this application.

Figure 7:
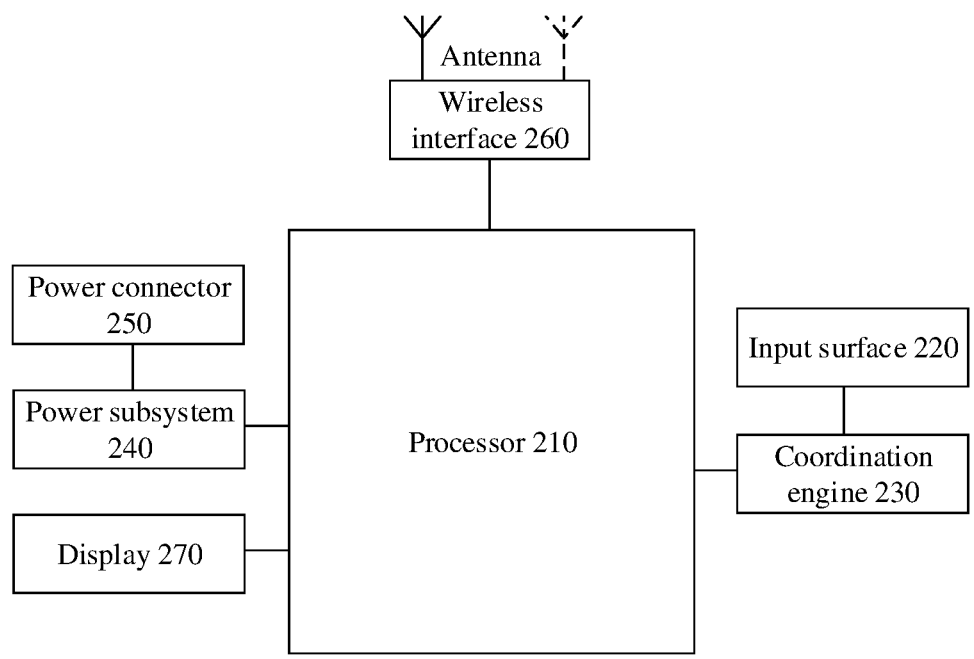
FIG. 7 is a schematic diagram of a hardware structure of an electronic device according to an embodiment of this application.

FIG. 7 is a schematic diagram of a hardware structure of an electronic device according to an embodiment of this application. Referring to FIG. 7, the electronic device 200 may include a plurality of subsystems. The subsystems cooperate to perform, coordinate, or monitor one or more operations or functions of the electronic device 202. The electronic device 200 includes a processor 210, an input surface 220, a coordination engine 230, a power subsystem 240, a power connector 250, a wireless interface 260, and a display 270.

For example, the coordination engine 230 may be configured to: communicate with other subsystems of the electronic device 200 and/or process data; communicate with a stylus 100 and/or exchange data; measure and/or obtain output of one or more analog or digital sensors (for example, a touch sensor); measure and/or obtain output of one or more sensor nodes in a sensor node array (for example, a capacitive sensing node array); receive and locate a signal from a tip of the stylus 100 and a ring signal; and locate the stylus 100 based on a position of an intersection area of the tip signal and a position of an intersection area of the ring signal.

The coordination engine 230 of the electronic device 200 includes or is otherwise communicatively coupled to a sensor layer located under an input surface 220 or integrated with the input surface. The coordination engine 230 locates the stylus 100 on the input surface 220 by using the sensor layer, and estimates an angular position of the stylus 100 relative to a plane on which the input surface 220 lies, by using the techniques described herein. In an embodiment, the input surface 220 may be referred to as a touchscreen 201.

For example, the sensor layer of the coordination engine 230 of the electronic device 200 is a grid of capacitive sensing nodes arranged in columns and rows. More specifically, an array of column traces is arranged perpendicular to an array of row traces. The sensor layer may be separated from other layers of the electronic device, or the sensor layer may be disposed directly on another layer. The other layers are, for example but not limited to: a display stack layer, a force sensor layer, a digitizer layer, a polarizer layer, a battery layer, and a structural or decorative shell layer.

The sensor layer can operate in various modes. If the sensor layer operates in a mutual capacitance mode, the column traces and the row traces form a single capacitive sensing node at each overlapping point (for example, a "vertical" mutual capacitance). If the sensor layer operates in a self-capacitance mode, the column traces and the row traces form two (vertically aligned) capacitive sensing nodes at each overlapping point. In another embodiment, if the sensor layer operates in a mutual capacitance mode, adjacent column traces and/or adjacent row traces may form a single capacitive sensing node (for example, a "horizontal" mutual capacitance). As described above, the sensor layer may detect presence of the tip 10 of the stylus 100 and/or touch by a user's finger by monitoring changes in capacitance (for example, mutual capacitance or self-capacitance) presented at each capacitive sensing node. In many cases, the coordination engine 230 may be configured to detect, by capacitive coupling, tip and ring signals received from the stylus 100 through the sensor layer.

The tip signal and/or the ring signal may include specific information and/or data that may be configured to cause the electronic device 200 to recognize the stylus 100. Such information is generally referred to as "stylus identity" information herein. Such information and/or data may be received by the sensor layer, and interpreted, decoded, and/or demodulated by the coordination engine 230.

The processor 210 may use the stylus identity information to simultaneously receive input from more than one stylus. Specifically, the coordination engine 230 may be configured to transmit a position and/or an angular position of each of the styluses detected by the coordination engine 230 to the processor 210. In other cases, the coordination engine 230 may also transmit relative information about relative positions and/or relative angular positions of the plurality of styluses detected by the coordination engine 230 to the processor 210. For example, the coordination engine 230 may notify the processor 210 of a position of a detected first stylus relative to a detected second stylus.

In other cases, the tip signal and/or the ring signal may further include specific information and/or data for enabling the electronic device 200 to identify a specific user. Such information is generally referred to as "user identity" information herein.

The coordination engine 230 may forward the user identity information (if detected and/or recovered) to the processor 210. If the user identity information cannot be recovered from the tip signal and/or the ring signal, the coordination engine 230 may optionally indicate to the processor 210 that the user identity information is unavailable. The processor 210 can utilize the user identity information (or absence of such information) in any suitable manner, including but not limited to accepting or denying input from the specific user and allowing or denying access to a specific function of the electronic device. The processor 210 may use the user identity information to simultaneously receive input from more than one user.

In still other cases, the tip signal and/or ring signal may include specific information and/or data that may be configured to cause the electronic device 200 to identify a setting or preference of the user or the stylus 100. Such information is generally referred to as "stylus settings" information herein.

The coordination engine 230 may forward the stylus settings information (if detected and/or recovered) to the processor 210. If the stylus settings information cannot be recovered from the tip signal and/or the ring signal, the coordination engine 230 may optionally indicate to the processor 210 that the stylus settings information is unavailable. The electronic device 200 can utilize the stylus settings information (or absence of such information) in any suitable manner, including but not limited to: applying a setting to the electronic device, applying a setting to a program running on the electronic device, changing a line thickness, a color, a pattern presented by a graphics program of the electronic device, and changing a setting of a video game operated on the electronic device.

In general, the processor 210 may be configured to perform, coordinate, and/or manage functions of the electronic device 200. Such functions may include but are not limited to: communicating with and/or exchanging data with other subsystems of the electronic device 200; communicating with and/or exchanging data with the stylus 100; performing data communication and/or data exchange over a wireless interface; performing data communication and/or data exchange over a wired interface; facilitating exchange of power through a wireless (for example, inductive or resonant) or wired interface; and receiving position(s) and angular position(s) of one or more styluses.

The processor 210 may be implemented as any electronic device capable of processing, receiving, or transmitting data or instructions. For example, the processor may be a microprocessor, a central processing unit, an application specific integrated circuit, a field programmable gate array, a digital signal processor, an analog circuit, a digital circuit, or a combination of these devices. The processor may be a single-threaded or multi-threaded processor. The processor may be a single-core or multi-core processor.

During use, the processor 210 may be configured to access a memory in which instructions are stored. The instructions may be configured to cause the processor to perform, coordinate, or monitor one or more operations or functions of the electronic device 200.

The instructions stored in the memory may be configured to control or coordinate operations of other components of the electronic device 200. The components are, for example but not limited to, another processor, an analog or digital circuit, a volatile or nonvolatile memory module, a display, a speaker, a microphone, a rotary input device, a button, or other physical input devices, a biometric authentication sensor and/or system, a force or touch input/output component, a communication module (for example, a wireless interface and/or a power connector), and/or a haptic device or a haptic feedback device.

The memory may further store electronic data for use by the stylus or the processor. For example, the memory may store electronic data or content (for example, a media file, a document, and an application program), a device setting and preference, a timing signal and a control signal, or data, a data structure, or a database for various modules, and a file or configuration related to detecting the tip signal and/or the ring signal. The memory may be configured as any type of memory. For example, the memory may be implemented as a random access memory, a read only memory, a flash memory, a removable memory, other types of storage elements, or a combination of such devices.

The electronic device 200 further includes the power subsystem 240. The power subsystem 240 may include a battery or other power sources. The power subsystem 240 may be configured to provide power to the electronic device 200. The power subsystem 240 may also be coupled to the power connector 250. The power connector 250 may be any suitable connector or port, and may be configured to receive power from an external power source and/or be configured to provide power to an external load. For example, in some embodiments, the power connector 250 may be configured to recharge a battery within the power subsystem 240. In another embodiment, the power connector 250 may be configured to transfer power stored in (or available to) the power subsystem 240 to the stylus 100.

The electronic device 200 further includes the wireless interface 260 to facilitate electronic communication between the electronic device 200 and the stylus 100. In an embodiment, the electronic device 200 may be configured to communicate with the stylus 100 via a low-energy bluetooth communication interface or a near field communication interface. In other examples, the communication interface helps implement electronic communication between the electronic device 200 and an external communication network, a device, or a platform.

The wireless interface 260 (whether the communication interface between the electronic device 200 and the stylus 100 or another communication interface) may be implemented as one or more wireless interfaces, bluetooth interfaces, near field communication interfaces, magnetic interfaces, universal serial bus interfaces, inductive interfaces, resonant interfaces, capacitive coupling interfaces, Wi-Fi interfaces, TCP/IP interfaces, network communication interfaces, optical interfaces, acoustic interfaces, or any traditional communication interfaces.

The electronic device 200 further includes a display 270. The display 270 may be located behind the input surface 220, or may be integrated therewith. The display 270 may be communicatively coupled to the processor 210. The processor 210 may use the display 270 to present information to a user. In many cases, the processor 210 uses the display 270 to present an interface with which a user may interact. In many cases, the user manipulates the stylus 100 to interact with the interface.

It will be apparent to those skilled in the art that some of the specific details presented above with respect to the electronic device 200 may not be required to practice particular embodiments or their equivalents. Similarly, other electronic devices may include more subsystems, modules, components, and the like. Some sub-modules may be implemented as software or hardware where appropriate. Therefore, it should be understood that the foregoing descriptions are not intended to be exhaustive or to limit the disclosure to the precise form set forth herein. On the contrary, it will be apparent to those of ordinary skill in the art that many modifications and variations are possible in light of the foregoing teachings.

Figure 8:
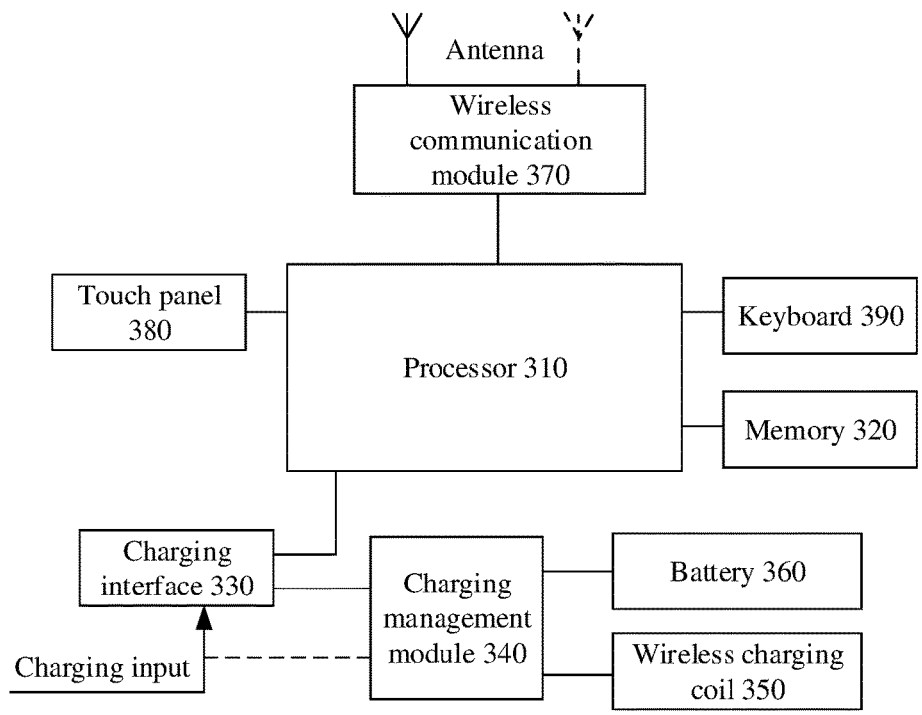
FIG. 8 is a schematic diagram of a hardware structure of a wireless keyboard according to an embodiment of this application.

FIG. 8 is a schematic diagram of a hardware structure of a wireless keyboard according to an embodiment of this application. Referring to FIG. 8, the wireless keyboard 300 may include a processor 310, a memory 320, a charging interface 330, a charging management module 340, a wireless charging coil 350, a battery 360, a wireless communication module 370, a touch panel 380, and a keyboard 390.

The processor 310, the memory 320, the charging interface 330, the charging management module 340, the battery 360, the wireless communication module 370, the touch panel 380, the keyboard 390, and the like may all be disposed on a keyboard body of the wireless keyboard 300 (that is, the second part 302 shown in FIG. 1). The wireless charging coil 350 may be disposed in a connecting portion 304 (as shown in FIG. 4) for movably connecting the keyboard body and a bracket. It should be understood that the structure illustrated in this embodiment does not constitute a specific limitation on the wireless keyboard 300. In some other embodiments, the wireless keyboard 300 may include components more or fewer than those shown in the figure, or combine some components, or split some components, or have a different component arrangement. The illustrated components may be implemented by hardware, software, or a combination of software and hardware.

The memory 320 may be configured to store program code, such as program code for wirelessly charging the stylus 100. The memory 320 may further store a bluetooth address that uniquely identifies the wireless keyboard 300. In addition, the memory 320 may further store connection data of an electronic device that has been successfully paired with the wireless keyboard 300 before. For example, the connection data may be a bluetooth address of the electronic device that has been successfully paired with the wireless keyboard 300. Based on the connection data, the wireless keyboard 300 can be automatically paired with the electronic device without having to configure a connection therewith, for example, performing a validity check. The bluetooth address may be a media access control (media access control, MAC) address.

The processor 310 may be configured to execute the foregoing application program code and invoke relevant modules to implement the functions of the wireless keyboard 300 in the embodiments of this application, for example, to implement a wired charging function, reverse wireless charging function, wireless communication function, and the like of the wireless keyboard 300. The processor 310 may include one or more processing units, and different processing units may be separate devices or may be integrated into one or more processors 310. The processor 310 may specifically be an integrated control chip or may include a circuit including various active and/or passive components, and the circuit is configured to perform the functions of the processor 310 described in the embodiments of this application. The processor of the wireless keyboard 300 may be a microprocessor.

The wireless communication module 370 may be configured to support data exchange between the wireless keyboard 300 and other electronic devices over wireless communication including bluetooth (bluetooth, BT), the global navigation satellite system (global navigation satellite system, GNSS), a wireless local area network (wireless local area networks, WLAN) (for example, a wireless fidelity (wireless fidelity, Wi-Fi) network), frequency modulation (frequency modulation, FM), near field communication (near field communication, NFC), an infrared (infrared, IR) technology, and the like.

In some embodiments, the wireless communication module 370 may be a bluetooth chip. The wireless keyboard 300 may be a bluetooth keyboard. The wireless keyboard 300 may be paired with a bluetooth chip of another electronic device through the bluetooth chip and establish a wireless connection, so as to implement wireless communication between the wireless keyboard 300 and the another electronic device through the wireless connection.

In addition, the wireless communication module 370 may further include an antenna. The wireless communication module 370 receives an electromagnetic wave via the antenna, performs frequency modulation and filtering on an electromagnetic wave signal, and transmits the processed signal to the processor 310. The wireless communication module 370 may also receive a to-be-sent signal from the processor 310, perform frequency modulation and amplification on the signal, and radiate the signal as an electromagnetic wave using the antenna.

In some embodiments, the wireless keyboard 300 may support wired charging. Specifically, the charging management module 340 may receive charging input of a wired charger through the charging interface 330.

In other embodiments, the wireless keyboard 300 may support forward wireless charging. The charging management module 340 may receive a wireless charging input through the wireless charging coil 350 of the wireless keyboard 300. Specifically, the charging management module 340 is connected to the wireless charging coil 350 through a matching circuit. The wireless charging coil 350 may be coupled with a wireless charging coil of a wireless charger and induce an alternating electromagnetic field emitted by the wireless charging coil 350 of the wireless charger to generate an alternating current signal. The alternating current signal generated by the wireless charging coil 350 is transmitted to the charging management module 340 through the matching circuit, so as to charge the battery 360 wirelessly.

The charging management module 340 may further provide power for the wireless keyboard 300 while charging the battery 360. The charging management module 340 receives input from the battery 360 to provide power for the processor 310, the memory 320, an external memory, the wireless communication module 370, and the like. The charging management module 340 may be further configured to monitor parameters such as battery capacity of the battery 360, a cycle count of the battery, and a state of health (leakage and impedance) of the battery. In some other embodiments, the charging management module 340 may alternatively be disposed in the processor 310.

In some other embodiments, the wireless keyboard 300 may support reverse wireless charging. Specifically, the charging management module 340 may further receive input from the charging interface 330 or the battery 360 and convert a direct current signal input from the charging interface 330 or the battery 360 into an alternating current signal. The alternating current signal is transmitted to the wireless charging coil 350 through the matching circuit. The wireless charging coil 350 may generate an alternating electromagnetic field upon receiving the alternating current signal. A wireless charging coil of another mobile terminal may perform wireless charging upon sensing the alternating electromagnetic field. That is, the wireless keyboard 300 may further wirelessly charge the another mobile terminal. In an embodiment, the wireless charging coil 350 may be disposed in an accommodating portion 303 of the wireless keyboard 300, and a wireless charging coil is disposed in the barrel 20 of a stylus 100. When the stylus 100 is placed in the accommodating portion 303, the wireless keyboard 300 may charge the stylus 100 through the wireless charging coil 350.

It should be noted that the matching circuit may be integrated in the charging management module 340, or the matching circuit may be independent of the charging management module 340, which is not limited in the embodiments of this application. FIG. 8 is a schematic diagram of a hardware structure of the wireless keyboard 300 by using as an example that the matching circuit may be integrated in the charging management module 340.

The charging interface 330 may be configured to provide a wired connection for charging or communication between the wireless keyboard 300 and another electronic device (for example, the wired charger of the wireless keyboard 300).

A touch sensor is integrated into the touch panel 380. A laptop may receive a control command of a user for the laptop through the touch panel 380 and the keyboard 390.

It should be understood that the structure illustrated in this embodiment of this application does not constitute a specific limitation on the wireless keyboard 300. The wireless keyboard 300 may have more or fewer components than those shown in FIG. 8, may combine two or more components, or may have a different component configuration. For example, a housing of the wireless keyboard 300 may be further provided with an accommodating chamber for accommodating the stylus 100. The wireless charging coil 350 is disposed in the accommodating chamber and is configured to wirelessly charge the stylus 100 after the stylus 100 is accommodated in the accommodating chamber.

For another example, an outer surface of the wireless keyboard 300 may further include components such as a key, an indicator light (which may indicate a state such as a battery level, an incoming/outgoing call, or a pairing mode), and a display (which may display prompt information to a user). The key may be a physical key, a touch key (used with the touch sensor), or the like and is configured to trigger operations such as power-on, power-off, start of charging, and end of charging.

Figure 9:
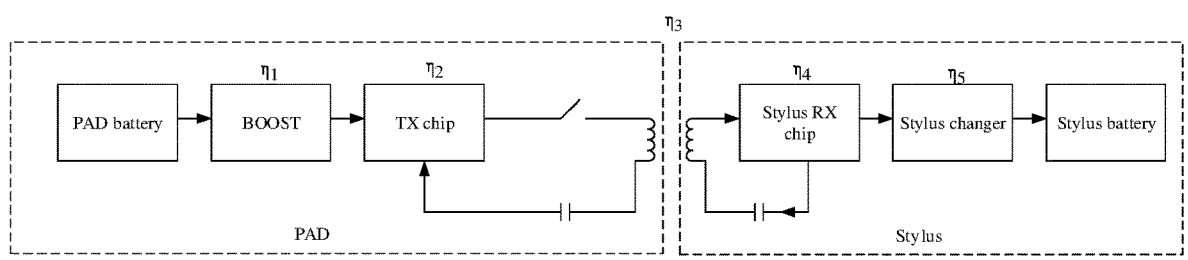
FIG. 9 is a schematic diagram of a wireless charging link in a possible design.

For example, FIG. 9 is a schematic diagram of a possible wireless charging link.

As shown in FIG. 9, a portable android device (portable android device, PAD) is used to charge a stylus. The PAD includes a PAD battery, a boost (BOOST) chip, a transmit (transport, TX) chip, and a coil. The stylus includes a coil, a receive (receive, RX) chip, a charger (charger) chip, and a battery.

The following briefly describes a principle of charging the stylus through the PAD in FIG. 9.

A voltage of the PAD battery is input to the boost chip, and the boost chip raises the voltage from the PAD battery and uses the raised voltage to power the TX chip. An estimated voltage conversion efficiency in this process is $\eta_1$.

The TX chip converts a direct current signal provided by the boost chip into an alternating current signal through inversion and transmits the signal to the coil, so that the coil sends the signal out. An estimated conversion efficiency in this process is $\eta_2$.

The coil of the PAD and the coil of the stylus are electromagnetically coupled to transmit energy from the PAD to the stylus. A coupling efficiency is present in the transmission process and an estimated efficiency is $\eta_3$.

The RX chip performs rectification and voltage change on an alternating current signal coupled by the coil of the stylus and outputs a stable direct current signal. An estimated efficiency in this process is $\eta_4$.

The RX chip outputs the direct current signal, and the direct current signal needs to be processed by the charger chip to charge the battery of the stylus. An estimated efficiency in this process is $\eta_5$.

Therefore, an overall link efficiency for charging the stylus by the PAD shown in FIG. 9 is:

$$\eta_{total} = \eta_1 * \eta_2 * \eta_3 * \eta_4 * \eta_5$$

According to project experience, under the premise that the coil of the PAD and the coil of the stylus are completely aligned, $\eta_{total}$ is about 35%. A link efficiency is relatively low, and the PAD and the stylus overheat severely during charging, resulting in low charging efficiency.

In view of this, in order to improve a charging speed and reduce temperature rise, this embodiment of this application provides a wireless charging circuit to improve overall efficiency of the wireless charging link. Specifically, the RX chip and the charger chip are designed as one component. Energy is coupled from the coil in the stylus, passes through the component, and then is directly output to a battery of the stylus, thereby shortening a wireless charging link and improving link efficiency. This can reduce temperature rise of the stylus during charging and improve charging efficiency.

The RX chip and the charger chip are designed as one component in this embodiment of this application because the RX chip and the charger chip are found to have identical or similar functional components.

Figure 10:
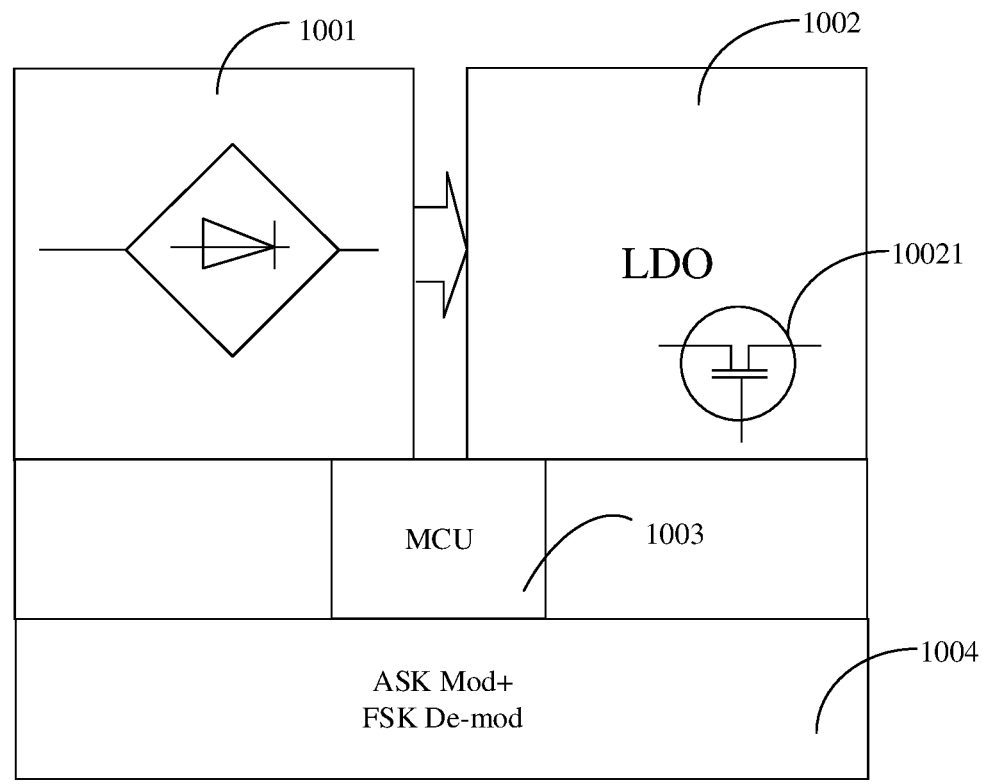
FIG. 10 is a schematic diagram of a hardware structure of an RX chip in a possible design.
Figure 11:
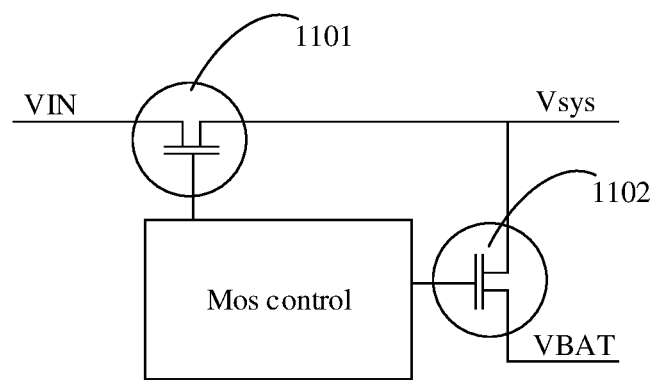
FIG. 11 is a schematic diagram of a hardware structure of a charger chip in a possible design.

For example, FIG. 10 is a schematic diagram of an internal structure of an RX chip. FIG. 11 is a schematic diagram of an internal structure of a charger chip.

As shown in FIG. 10, the RX chip includes a rectifier 1001, a low dropout regulator (low dropout regulator, LDO) 1002, a micro-control unit (micro control unit, MCU) 1003, and a protocol encoding/decoding unit 1004.

The rectifier 1001 is configured to rectify an alternating current signal coupled by the coil in the stylus to obtain a relatively stable direct current signal, and the direct current signal is used as an input of the LDO 1002.

The LDO 1002 is configured to convert the direct current signal after rectification into a standard 5V (which may be certainly any other voltage values, where this is not limited in this embodiment of this application) voltage signal as an input signal of the charger chip.

The MCU 1003 is configured to execute software code in the stylus and can be controlled by a register.

The protocol encoding/decoding unit 1004 is configured to communicate with the TX chip. The protocol encoding/decoding unit 1004 may include an amplitude-shift keying (amplitude-shift keying, ASK) modulation format or a frequency-shift keying (frequency-shift keying, FSK) modulation format, which is not specifically limited in this embodiment of this application.

The LDO 1002 generally includes a field effect transistor 10021, for example, the field effect transistor may include a metal-oxide-semiconductor field-effect transistor (metal-oxide-semiconductor field-effect transistor, MOSFET).

As shown in FIG. 11, the charger chip includes a field effect transistor 1101 (hereinafter referred to as Q1), a field effect transistor 1102 (hereinafter referred to as Q2), and a control circuit for controlling Q1 and Q2. The control circuit may be implemented by hardware or software, which is not limited in this embodiment of this application.

Q1 may be a MOSFET or the like, and is used as a main LDO to perform voltage stabilization on an input signal VIN from the RX chip and then supply power to a post-stage system.

Q2 may be a MOSFET or the like, and is used to isolate a system power supply from the battery and provides a function of dynamic path management.

Through comparison between FIG. 10 and FIG. 11, it can be found that the LDO in the RX chip may be physically implemented as one MOSFET, and the charger chip may be physically implemented as two MOSFETs, the first MOSFET (Q1) in the charger chip having a same function as the LDO. Therefore, in this embodiment of this application, the LDO in the RX chip can be reused as Q1 in the charger chip, and the RX chip and the charger chip are designed as one component. In this way, the component can implement functions of the RX chip and the charger chip and the wireless charging link can be shortened to improve link efficiency, thereby reducing temperature rise of the stylus during charging and improving charging efficiency.

It should be noted that, in a possible implementation, the LDO 1002 in FIG. 10 and the field effect transistor 1101 for implementing the LDO function in FIG. 11 may alternatively be replaced by a boost circuit (buck) or a switched capacitor (switched capacitor, SC) amplifying circuit for higher power charging. The buck may include two MOSFETs, and the SC may include nine MOSFETs, which are not limited in this embodiment of this application.

Figure 12:
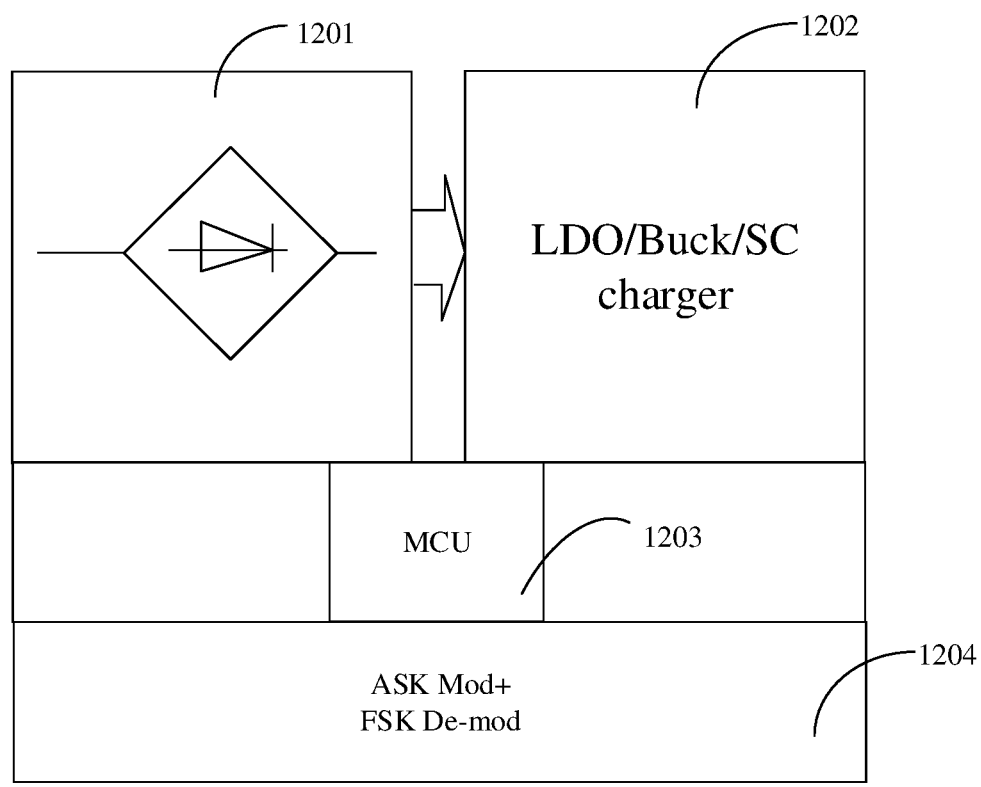
FIG. 12 is a schematic diagram of a hardware structure of a chip according to an embodiment of this application.

For example, FIG. 12 is a schematic diagram of a chip according to an embodiment of this application, and the chip can implement functions of an RX chip and a charger chip.

As shown in FIG. 12, the chip includes a rectifier 1201, an LDO/Buck/SC charger 1202 (which is the foregoing part for implementing functions of LDO/Buck/SC and charger chip, and may be referred to as a charger unit), an MCU 1203, and a protocol encoding/decoding unit 1204.

The rectifier 1201 is configured to rectify an alternating current signal coupled by the coil in the stylus to obtain a relatively stable direct current signal, and the direct current signal is used as an input of the LDO/Buck/SC charger 1202.

The LDO/Buck/SC charger 1202 is configured to perform voltage stabilization on a direct current signal obtained through rectification and charge a battery.

The MCU 1203 is configured to control wireless communication, the LDO/Buck/SC charger 1202, the protocol encoding/decoding unit 1204, and the like.

The protocol encoding/decoding unit 1204 is configured to communicate with the TX chip. The protocol encoding/decoding unit 1204 may include an amplitude-shift keying (amplitude-shift keying, ASK) modulation format or a frequency-shift keying (frequency-shift keying, FSK) modulation format, which is not specifically limited in this embodiment of this application.

It can be understood that, in this embodiment of this application, because the RX chip and the charger chip are designed as one chip, the functions of the RX chip and the charger chip can be implemented and the wireless charging link can be also shortened to improve link efficiency, thereby reducing temperature rise of the stylus during charging and improving charging efficiency.

Figure 13:
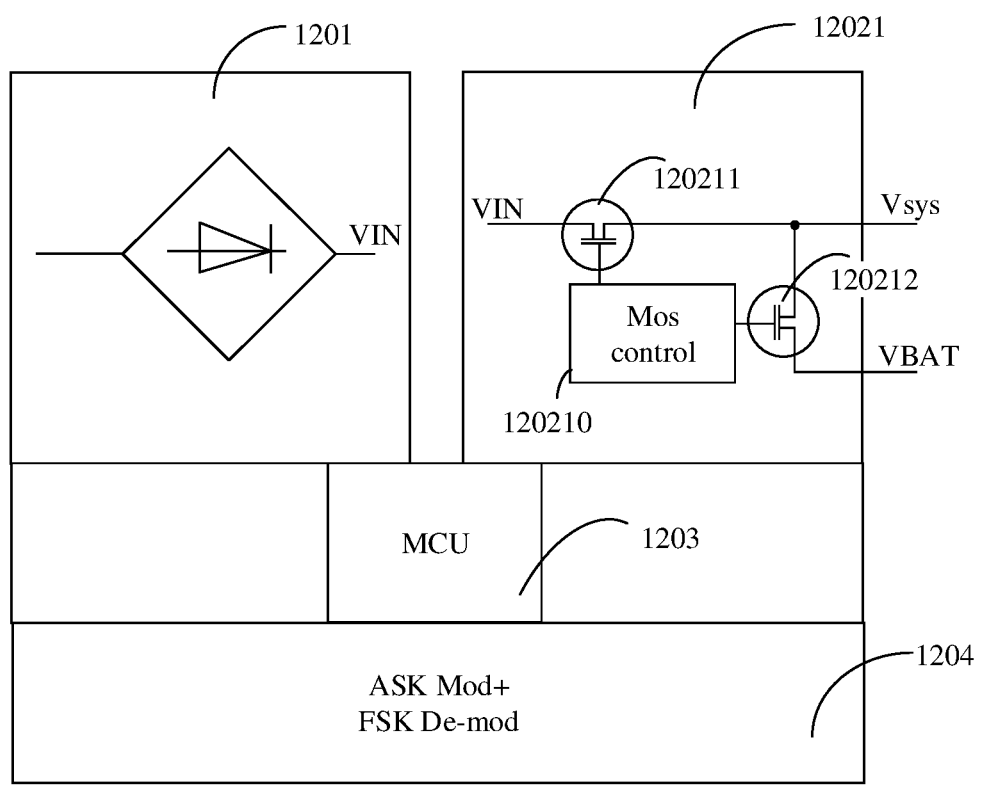
FIG. 13 is a schematic diagram of a specific hardware structure of a chip according to an embodiment of this application.
Figure 14:
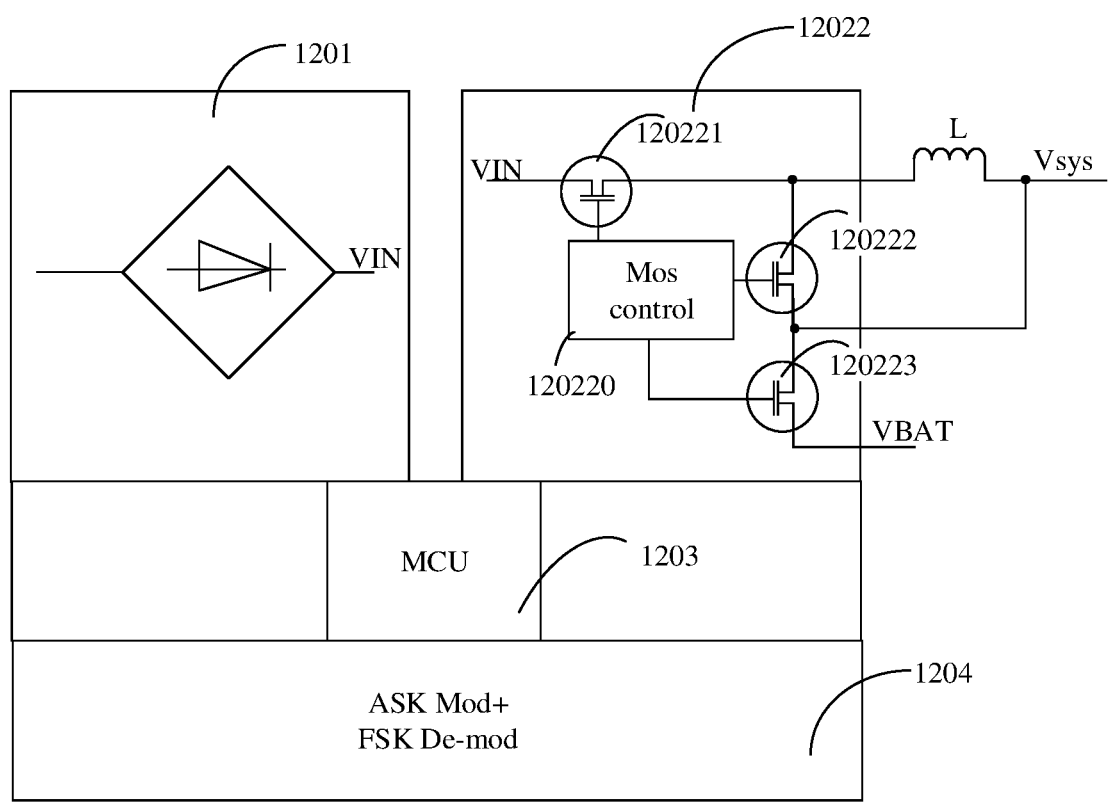
FIG. 14 is a schematic diagram of a specific hardware structure of a chip according to an embodiment of this application.
Figure 15:
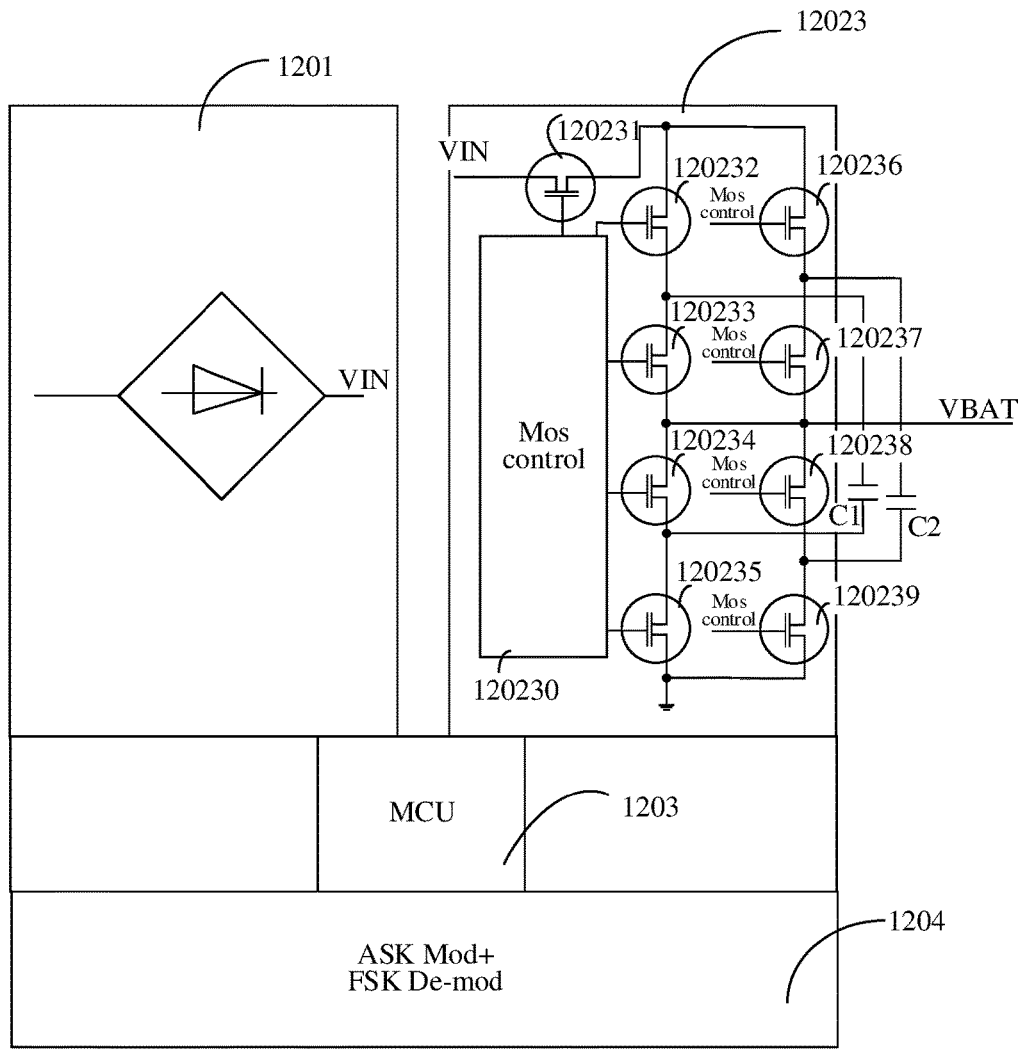
FIG. 15 is a schematic diagram of a specific hardware structure of a chip according to an embodiment of this application.

For example, FIG. 13 to FIG. 15 are schematic diagrams of hardware structures of a chip including an LDO charger, a chip including a buck charger, and a chip including an SC charger respectively.

As shown in FIG. 13, the charger unit 1202 in FIG. 12 may include an LDO charger 12021, and the LDO charger 12021 includes a first field effect transistor control module 120210, a first field effect transistor 120211, and a second field effect transistor 120212.

A gate terminal of the first field effect transistor 120211 and a gate terminal of the second field effect transistor 120212 are both connected to the first field effect transistor control module 120210, a source terminal of the first field effect transistor 120211 is connected to an output terminal of the rectifier 1201, a drain terminal of the first field effect transistor 120211 is connected to a source terminal of the second field effect transistor 120212, and a drain terminal of the second field effect transistor 120212 is used to charge a battery of the stylus.

The first field effect transistor control module 120210 is configured to control a voltage value of the gate terminal of the first field effect transistor 120211 and that of the gate terminal of the second field effect transistor 120212, so as to control on/off of the first field effect transistor 120211 and the second field effect transistor 120212.

The first field effect transistor 120211 is configured to stabilize a voltage output by the rectifier 1201 to reach a charging voltage required by the stylus, and the second field effect transistor 120212 is configured to isolate a system power supply of the chip from the battery of the stylus.

It can be understood that the drain terminal of the first field effect transistor 120211 can also be used to provide a voltage output for other devices, for example, the drain terminal of the first field effect transistor 120211 can output Vsys or the like, which is not specifically limited in this embodiment of this application.

In this embodiment of this application, the chip includes an LDO charger 12021, and the LDO charger 12021 includes a relatively small quantity of field effect transistors and has a relatively simple structure.

As shown in FIG. 14, the charger unit 1202 in FIG. 12 may include a buck charger 12022, and the buck charger 12022 includes a second field effect transistor control module 120220, a third field effect transistor 120221, a fourth field effect transistor 120222, and a fifth field effect transistor 120223.

A gate terminal of the third field effect transistor 120221, a gate terminal of the fourth field effect transistor 120222, and a gate terminal of the fifth field effect transistor 120223 are all connected to the second field effect transistor control module 120220, a source terminal of the third field effect transistor 120221 is connected to an output terminal of the rectifier 1201, a drain terminal of the third field effect transistor 120221 is connected to a source terminal of the fourth field effect transistor 120222 and one end of an inductor L, a drain terminal of the fourth field effect transistor 120222 is connected to a source terminal of the fifth field effect transistor 120223 and the other end of the inductor L, and a drain terminal of the fifth field effect transistor 120223 is configured to charge a battery of the stylus.

The second field effect transistor control module 120220 is configured to control voltage values of the gate terminal of the third field effect transistor 120221, the gate terminal of the fourth field effect transistor 120222, and the gate terminal of the fifth field effect transistor 120223, so as to control on/off of the third field effect transistor 120221, the fourth field effect transistor 120222, and the fifth field effect transistor 120223.

The third field effect transistor 120221, the fourth field effect transistor 120222, and the inductor L can implement flexible and stable conversion of VIN to obtain a charging voltage required by the stylus; and the fifth field effect transistor 120223 is configured to isolate a system power supply of the chip from the battery of the stylus.

It can be understood that the drain terminal of the fourth field effect transistor 120222 can also be used to provide a voltage output for other devices, for example, the drain terminal of the fourth field effect transistor 120222 can output Vsys or the like, which is not specifically limited in this embodiment of this application.

In this embodiment of this application, the chip includes a buck charger 12022, and the buck charger 12022 has a larger quantity of field effect transistors than the LDO charger 12021. With the third field effect transistor 120221, the fourth field effect transistor 120222, and the inductor L, flexible and stable voltage conversion of VIN can be implemented to achieve relatively high efficiency.

As shown in FIG. 15, the charger unit 1202 in FIG. 12 may include an SC charger 12023, and the SC charger 12023 includes a third field effect transistor control module 120230, a sixth field effect transistor 120231, a seventh field effect transistor 120232, an eighth field effect transistor 120233, a ninth field effect transistor 120234, a tenth field effect transistor 120235, an eleventh field effect transistor 120236, a twelfth field effect transistor 120237, a thirteenth field effect transistor 120238, and a fourteenth field effect transistor 120239.

A gate terminal of each of the sixth field effect transistor 120231, the seventh field effect transistor 120232, the eighth field effect transistor 120233, the ninth field effect transistor 120234, the tenth field effect transistor 120235, the eleventh field effect transistor 120236, the twelfth field effect transistor 120237, the thirteenth field effect transistor 120238, and the fourteenth field effect transistor 120239 is connected to the third field effect transistor control module 120230.

A source terminal of the sixth field effect transistor 120231 is connected to an output terminal of the rectifier 1201, a drain terminal of the sixth field effect transistor 120231 is connected to a source terminal of the seventh field effect transistor 120232 and a source terminal of the eleventh field effect transistor 120236, a drain terminal of the seventh field effect transistor 120232 is connected to a source terminal of the eighth field effect transistor 120233 and one end of a capacitor C1, and a drain terminal of the eighth field effect transistor 120233 is connected to a source terminal of the ninth field effect transistor 120234, a drain terminal of the twelfth field effect transistor 120237 is connected to a source terminal of the thirteenth field effect transistor 120238, a drain terminal of the ninth field effect transistor 120234 is connected to a source terminal of the tenth field effect transistor 120235 and the other end of the capacitor C1, a drain terminal of the tenth field effect transistor 120235 and a drain terminal of the fourteenth field effect transistor 120239 are both grounded, a drain terminal of the eleventh field effect transistor 120236 is connected to a source terminal of the twelfth field effect transistor 120237 and one end of a capacitor C2, a drain terminal of the twelfth field effect transistor 120237 is connected to a source terminal of the thirteenth field effect transistor 120238, and a drain terminal of the thirteenth field effect transistor 120238 is connected to a source terminal of the fourteenth field effect transistor 120239 and the other end of the capacitor C2, where the drain terminal of the eighth field effect transistor 120233 being connected to the drain terminal of the twelfth field effect transistor 120237 is used to charge a battery of the stylus.

The sixth field effect transistor 120231, the seventh field effect transistor 120232, the eighth field effect transistor 120233, the ninth field effect transistor 120234, the tenth field effect transistor 120235, the eleventh field effect transistor 120236, the twelfth field effect transistor 120237, the thirteenth field effect transistor 120238, the fourteenth field effect transistor 120239, the capacitor C1, and the capacitor C2 can implement flexible and stable conversion of VIN and isolate the system power supply of the chip from the battery of the stylus.

It should be noted that the source terminal and the drain terminal of each field effect transistor in the foregoing FIG. 13 to FIG. 15 can be used interchangeably, which is not limited in this embodiment of this application.

For example, in response to the chip structures in FIG. 12 to FIG. 15, FIG. 16 is a schematic diagram of a wireless charging link according to an embodiment of this application.

Figure 16:
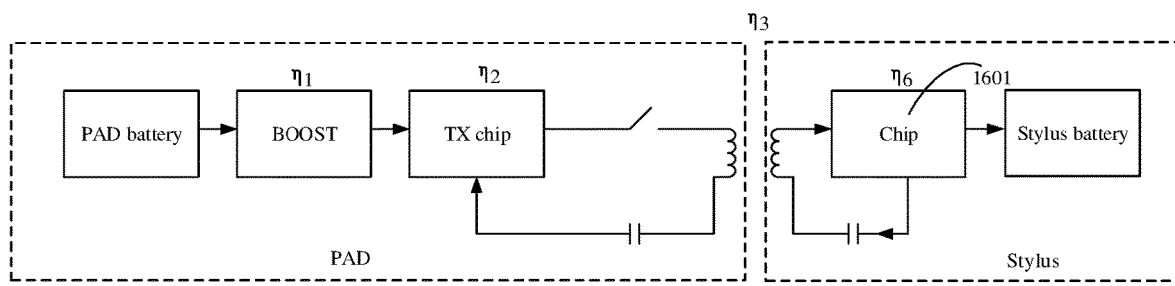
FIG. 16 is a schematic diagram of a wireless charging link according to an embodiment of this application.

As shown in FIG. 16, a PAD is configured to charge a stylus. The PAD includes a PAD battery, a boost (BOOST) chip, a transmit (transport, TX) chip, and a coil. The stylus includes a coil, a chip 1301 (for implementing RX and charger functions), and a battery.

The following briefly describes a principle of charging the stylus by using the PAD in FIG. 16.

A voltage of the PAD battery is input to the boost chip, and the boost chip raises the voltage from the PAD battery and uses the raised voltage to power the TX chip. An estimated voltage conversion efficiency in this process is $\eta_1$.

The TX chip converts a direct current signal provided by the boost chip into an alternating current signal through inversion and transmits the signal to the coil, so that the coil sends the signal out. An estimated conversion efficiency in this process is $\eta_2$.

The coil of the PAD and the coil of the stylus are electromagnetically coupled to transmit energy from the PAD to the stylus. A coupling efficiency is present in the transmission process and an estimated efficiency is $\eta_3$.

The chip 1601 performs rectification and voltage change on an alternating current coupled by the coil of the stylus, and outputs a stable direct current signal to charge the battery of the stylus. An estimated efficiency in this process is $\eta_6$. $\eta_6$ and $\eta_4$ described above may be the same or different and are not specifically limited in this embodiment of this application.

Therefore, an overall link efficiency for charging the stylus by the PAD shown in FIG. 16 is:

$$\eta_{total} = \eta_1 * \eta_2 * \eta_3 * \eta_6$$

It can be learned that, compared with the wireless charging link in FIG. 9, the wireless charging link in FIG. 16 reduces one efficiency-generating step. Therefore, the wireless charging link in FIG. 16 has higher link efficiency, thereby reducing temperature rise of the stylus during charging and improving charging efficiency.

It should be noted that the chip 1301 in this embodiment of this application may be an RX chip, a charger chip, or the like. However, functions of the chip 1601 include both the RX function and the charger function, and a specific name of the chip 1601 is not limited in this embodiment of this application.

It should be noted that the PAD in this embodiment of this application may be replaced with a wireless keyboard or the like, and then the stylus can be charged by using the wireless keyboard or the like.

It can be understood that the chip and the wireless charging circuit in the embodiments of this application can also be applied to other applicable wireless charging scenarios, and the wireless charging scenarios are not specifically limited in the embodiments of this application.

The foregoing embodiments, schematic structural diagrams, or schematic simulation diagrams are only for schematically illustrating the technical solutions of this application, and size scales therein do not constitute any limitation on the protection scope of the technical solutions. Any modification, equivalent replacement, and improvement made without departing from the spirit and principle of the embodiments shall fall within the protection scope of the technical solutions.

What is claimed is:

1. A wireless charging system, comprising:
an electronic device; and
a stylus, comprising a wireless charging circuit, wherein the wireless charging circuit comprises a first coil, a chip, and a first battery;
wherein the electronic device is configured to wirelessly charge the stylus; and
wherein the first coil is configured to be coupled to a second coil of the electronic device to obtain an alternating current signal;
wherein the chip comprises a rectifier, a charger circuit, a micro-control circuit, and a protocol encoding/decoding circuit;
wherein the rectifier is configured to rectify an input alternating current signal into a direct current signal;
wherein the charger circuit is configured to charge the first battery using the direct current signal from the rectifier;
wherein the protocol encoding/decoding circuit is configured to communicate with a transmit chip;
wherein the micro-control circuit is configured to control the charger circuit and the protocol encoding/decoding circuit; and wherein, when the charging circuit is a voltage stabilizing charging circuit, the charger circuit comprises a first field effect transistor control circuit, a first field effect transistor, and a second field effect transistor, wherein the first field effect transistor is configured to convert the direct current signal of the rectifier into a charging voltage required by the stylus, and the second field effect transistor is configured to isolate a system power supply of the chip from a battery of the stylus, a gate terminal of the first field effect transistor and a gate terminal of the second field effect transistor are both connected to the first field effect transistor control circuit, a source terminal of the first field effect transistor is connected to an output terminal of the rectifier, a drain terminal of the first field effect transistor is connected to a source terminal of the second field effect transistor, and a drain terminal of the second field effect transistor is used to charge a battery of the stylus.

2. The wireless charging system according to claim 1, wherein, when the charging circuit is a boost charging circuit, the charging circuit comprises a second field effect transistor control circuit, a third field effect transistor, a fourth field effect transistor, and a fifth field effect transistor, wherein a gate terminal of the third field effect transistor, a gate terminal of the fourth field effect transistor, and a gate terminal of the fifth field effect transistor are all connected to the second field effect transistor control circuit, a source terminal of the third field effect transistor is connected to an output terminal of the rectifier, a drain terminal of the third field effect transistor is connected to a source terminal of the fourth field effect transistor and a first end of an inductor L, a drain terminal of the fourth field effect transistor is connected to a source terminal of the fifth field effect transistor and a second end of the inductor L, and a drain terminal of the fifth field effect transistor is configured to charge a battery of the stylus.

3. The wireless charging system according to claim 1, wherein when the charging circuit is a switched capacitor charging circuit, the charging circuit comprises:
a third field effect transistor control circuit, a sixth field effect transistor, a seventh field effect transistor, an eighth field effect transistor, a ninth field effect transistor, a tenth field effect transistor, an eleventh field effect transistor, a twelfth field effect transistor, a thirteenth field effect transistor, and a fourteenth field effect transistor;
wherein a gate terminal of each of the sixth field effect transistor, the seventh field effect transistor, the eighth field effect transistor, the ninth field effect transistor, the tenth field effect transistor, the eleventh field effect transistor, the twelfth field effect transistor, the thirteenth field effect transistor, and the fourteenth field effect transistor is connected to the third field effect transistor control circuit; and
wherein a source terminal of the sixth field effect transistor is connected to an output terminal of the rectifier, a drain terminal of the sixth field effect transistor is connected to a source terminal of the seventh field effect transistor and a source terminal of the eleventh field effect transistor, a drain terminal of the seventh field effect transistor is connected to a source terminal of the eighth field effect transistor and a first end of a capacitor C1, and a drain terminal of the eighth field effect transistor is connected to a source terminal of the ninth field effect transistor, a drain terminal of the twelfth field effect transistor is connected to a source terminal of the thirteenth field effect transistor, a drain terminal of the ninth field effect transistor is connected to a source terminal of the tenth field effect transistor and a second end of the capacitor C1, a drain terminal of the tenth field effect transistor and a drain terminal of the fourteenth field effect transistor are both grounded, a drain terminal of the eleventh field effect transistor is connected to a source terminal of the twelfth field effect transistor and a first end of a capacitor C2, a drain terminal of the twelfth field effect transistor is connected to a source terminal of the thirteenth field effect transistor, and a drain terminal of the thirteenth field effect transistor is connected to a source terminal of the fourteenth field effect transistor and a second end of the capacitor C2, and wherein the drain terminal of the eighth field effect transistor being connected to the drain terminal of the twelfth field effect transistor is configured to be used to charge a battery of the stylus.

4. The wireless charging system according to claim 1, wherein:
the electronic device comprises a second battery, a boost chip, a transmit chip, and the second coil;
the second battery is configured to input voltage to the boost chip;
the boost chip is configured to boost the voltage to obtain a first direct current signal;
the transmit chip is configured to invert the first direct current signal into a first alternating current signal and transmit the first alternating current signal to the second coil; and
the second coil is coupled to the first coil using the first alternating current signal.

5. The wireless charging system according to claim 1, wherein the electronic device is a tablet computer.

6. The wireless charging system according to claim 1, wherein the electronic device is a wireless keyboard.

7. A chip, comprising:
a rectifier;
a charger circuit;
a micro-control circuit; and
a protocol encoding/decoding circuit;
wherein the rectifier is configured to rectify an input alternating current signal into a direct current signal;
wherein the charger circuit is configured to charge a battery using the direct current signal from the rectifier;
wherein the protocol encoding/decoding circuit is configured to communicate with a transmit chip; and
wherein the micro-control circuit is configured to control the charger circuit and the protocol encoding/decoding circuit; and
wherein, when the charging circuit is a voltage stabilizing charging circuit, the charger circuit comprises a first field effect transistor control circuit, a first field effect transistor, and a second field effect transistor, wherein the first field effect transistor is configured to convert the direct current signal of the rectifier into a charging voltage required by a stylus, the second field effect transistor is configured to isolate a system power supply of the chip from a battery of the stylus, a gate terminal of the first field effect transistor and a gate terminal of the second field effect transistor are both connected to the first field effect transistor control circuit, a source terminal of the first field effect transistor is connected to an output terminal of the rectifier, a drain terminal of the first field effect transistor is connected to a source terminal of the second field effect transistor, and a drain terminal of the second field effect transistor is used to charge a battery of the stylus.

8. The chip according to claim 7, wherein, when the charging circuit is a boost charging circuit, the charging circuit comprises a second field effect transistor control circuit, a third field effect transistor, a fourth field effect transistor, and a fifth field effect transistor, wherein a gate terminal of the third field effect transistor, a gate terminal of the fourth field effect transistor, and a gate terminal of the fifth field effect transistor are all connected to the second field effect transistor control circuit, a source terminal of the third field effect transistor is connected to an output terminal of the rectifier, a drain terminal of the third field effect transistor is connected to a source terminal of the fourth field effect transistor and a first end of an inductor L, a drain terminal of the fourth field effect transistor is connected to a source terminal of the fifth field effect transistor and a second end of the inductor L, and a drain terminal of the fifth field effect transistor is configured to charge a battery of the stylus.

9. The chip according to claim 8, wherein, when the charging circuit is a switched capacitor charging circuit, the charging circuit comprises:
a third field effect transistor control circuit, a sixth field effect transistor, a seventh field effect transistor, an eighth field effect transistor, a ninth field effect transistor, a tenth field effect transistor, an eleventh field effect transistor, a twelfth field effect transistor, a thirteenth field effect transistor, and a fourteenth field effect transistor;
wherein a gate terminal of each of the sixth field effect transistor, the seventh field effect transistor, the eighth field effect transistor, the ninth field effect transistor, the tenth field effect transistor, the eleventh field effect transistor, the twelfth field effect transistor, the thirteenth field effect transistor, and the fourteenth field effect transistor is connected to the third field effect transistor control circuit; and
wherein a source terminal of the sixth field effect transistor is connected to an output terminal of the rectifier, a drain terminal of the sixth field effect transistor is connected to a source terminal of the seventh field effect transistor and a source terminal of the eleventh field effect transistor, a drain terminal of the seventh field effect transistor is connected to a source terminal of the eighth field effect transistor and a first end of a capacitor C1, and a drain terminal of the eighth field effect transistor is connected to a source terminal of the ninth field effect transistor, a drain terminal of the twelfth field effect transistor is connected to a source terminal of the thirteenth field effect transistor, a drain terminal of the ninth field effect transistor is connected to a source terminal of the tenth field effect transistor and a second end of the capacitor C1, a drain terminal of the tenth field effect transistor and a drain terminal of the fourteenth field effect transistor are both grounded, a drain terminal of the eleventh field effect transistor is connected to a source terminal of the twelfth field effect transistor and a first end of a capacitor C2, a drain terminal of the twelfth field effect transistor is connected to a source terminal of the thirteenth field effect transistor, and a drain terminal of the thirteenth field effect transistor is connected to a source terminal of the fourteenth field effect transistor and a second end of the capacitor C2, and wherein the drain terminal of the eighth field effect transistor being connected to the drain terminal of the twelfth field effect transistor is configured to be used to charge a battery of the stylus.

10. A wireless charging circuit, applied to a stylus, wherein the wireless charging circuit comprises a first coil, a chip, and a first battery;
wherein the first coil is coupled to a second coil of an electronic device and obtains an alternating current signal;
wherein the chip comprises a rectifier, a charger circuit, a micro-control circuit, and a protocol encoding/decoding circuit;
wherein the rectifier is configured to rectify an input alternating current signal into a direct current signal;
wherein the charger circuit is configured to charge the first battery using the direct current signal from the rectifier, wherein the charger circuit comprises a voltage-stabilizing charging circuit, a boost charging circuit, or a switched capacitor charging circuit;
wherein the protocol encoding/decoding circuit is configured to communicate with a transmit chip; and
wherein the micro-control circuit is configured to control the charger circuit and the protocol encoding/decoding circuit; and
wherein, when the charging circuit is a voltage stabilizing charging circuit, the charger circuit comprises a first field effect transistor control circuit, a first field effect transistor, and a second field effect transistor, wherein the first field effect transistor is configured to convert the direct current signal of the rectifier into a charging voltage required by the stylus, and the second field effect transistor is configured to isolate a system power supply of the chip from a battery of the stylus, a gate terminal of the first field effect transistor and a gate terminal of the second field effect transistor are both connected to the first field effect transistor control circuit, a source terminal of the first field effect transistor is connected to an output terminal of the rectifier, a drain terminal of the first field effect transistor is connected to a source terminal of the second field effect transistor, and a drain terminal of the second field effect transistor is configured to be used to charge a battery of the stylus.

11. The wireless charging circuit according to claim 10, wherein, when the charging circuit is a boost charging circuit, the charging circuit comprises a second field effect transistor control circuit, a third field effect transistor, a fourth field effect transistor, and a fifth field effect transistor, wherein a gate terminal of the third field effect transistor, a gate terminal of the fourth field effect transistor, and a gate terminal of the fifth field effect transistor are all connected to the second field effect transistor control circuit, a source terminal of the third field effect transistor is connected to an output terminal of the rectifier, a drain terminal of the third field effect transistor is connected to a source terminal of the fourth field effect transistor and a first end of an inductor L, a drain terminal of the fourth field effect transistor is connected to a source terminal of the fifth field effect transistor and a second end of the inductor L, and a drain terminal of the fifth field effect transistor is configured to charge a battery of the stylus.

12. The wireless charging circuit according to claim 10, wherein when the charging circuit is a switched capacitor charging circuit, the charging circuit comprises:
a third field effect transistor control circuit, a sixth field effect transistor, a seventh field effect transistor, an eighth field effect transistor, a ninth field effect transistor, a tenth field effect transistor, an eleventh field effect transistor, a twelfth field effect transistor, a thirteenth field effect transistor, and a fourteenth field effect transistor;

wherein a gate terminal of each of the sixth field effect transistor, the seventh field effect transistor, the eighth field effect transistor, the ninth field effect transistor, the tenth field effect transistor, the eleventh field effect transistor, the twelfth field effect transistor, the thirteenth field effect transistor, and the fourteenth field effect transistor is connected to the third field effect transistor control circuit; and wherein a source terminal of the sixth field effect transistor is connected to an output terminal of the rectifier, a drain terminal of the sixth field effect transistor is connected to a source terminal of the seventh field effect transistor and a source terminal of the eleventh field effect transistor, a drain terminal of the seventh field effect transistor is connected to a source terminal of the eighth field effect transistor and a first end of a capacitor C1, a drain terminal of the eighth field effect transistor is connected to a source terminal of the ninth field effect transistor, a drain terminal of the twelfth field effect transistor is connected to a source terminal of the thirteenth field effect transistor, a drain terminal of the ninth field effect transistor is connected to a source terminal of the tenth field effect transistor and a second end of the capacitor C1, a drain terminal of the tenth field effect transistor and a drain terminal of the fourteenth field effect transistor are both grounded, a drain terminal of the eleventh field effect transistor is connected to a source terminal of the twelfth field effect transistor and a first end of a capacitor C2, a drain terminal of the twelfth field effect transistor is connected to a source terminal of the thirteenth field effect transistor, and a drain terminal of the thirteenth field effect transistor is connected to a source terminal of the fourteenth field effect transistor and a second end of the capacitor C2, wherein the drain terminal of the eighth field effect transistor being connected to the drain terminal of the twelfth field effect transistor is configured to be used to charge a battery of the stylus.

13. The wireless charging circuit according to claim 10, wherein the charger circuit comprises the voltage-stabilizing charging circuit.

14. The wireless charging circuit according to claim 10, wherein the charger circuit comprises the boost charging circuit.

15. The wireless charging circuit according to claim 10, wherein the charger circuit comprises the switched capacitor charging circuit.

* * * * *